(12) United States Patent
Berkovich

(10) Patent No.: US 10,687,034 B1
(45) Date of Patent: Jun. 16, 2020

(54) IMAGE SENSOR WITH SWITCHABLE OPTICAL FILTER

(71) Applicant: Facebook Technologies, LLC, Menlo Park, CA (US)

(72) Inventor: Andrew Samuel Berkovich, Redmond, WA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 57 days.

(21) Appl. No.: 15/960,304

(22) Filed: Apr. 23, 2018

(51) Int. Cl.
| | |
|---|---|
| H04N 9/083 | (2006.01) |
| G01J 1/44 | (2006.01) |
| G01J 1/04 | (2006.01) |
| G01S 17/08 | (2006.01) |
| G02F 1/163 | (2006.01) |
| G01S 17/89 | (2020.01) |
| G02B 27/01 | (2006.01) |

(52) U.S. Cl.
CPC ............ *H04N 9/083* (2013.01); *G01J 1/0437* (2013.01); *G01J 1/44* (2013.01); *G01S 17/08* (2013.01); *G01S 17/89* (2013.01); *G02F 1/163* (2013.01); *G02B 27/0172* (2013.01); *G02B 2027/0138* (2013.01); *G02B 2027/0178* (2013.01)

(58) Field of Classification Search
CPC .......... H04N 9/083; G01J 1/0437; G01J 1/44; G01S 17/08; G01S 17/89; G02F 1/163
USPC ........................................................ 348/135
See application file for complete search history.

(56) References Cited

U.S. PATENT DOCUMENTS

| | | | | |
|---|---|---|---|---|
| 2013/0271811 A1* | 10/2013 | Lam | ........................ | E06B 9/24 |
| | | | | 359/266 |
| 2015/0177382 A1* | 6/2015 | Vogel | ..................... | G01S 17/08 |
| | | | | 250/203.2 |
| 2017/0276543 A1* | 9/2017 | Bogaki | ..................... | G01J 1/04 |
| 2018/0089847 A1* | 3/2018 | Lee | ......................... | G01S 17/36 |

OTHER PUBLICATIONS

Murray et al., "Electrically Controllable Light Trapping for Self-Powered Switchable Solar Windows," ACS Publications, American Chemical Society, ACS Photonics 2017, 4, 7 pages.

V. Koifman, "Image Sensors World," retrieved from http://image-sensors-world.blogspot.com/2017/11/perovskites-materials-for-foveon-like.html and printed on Jan. 10, 2019, 8 pages.

* cited by examiner

*Primary Examiner* — Nguyen T Truong

(74) *Attorney, Agent, or Firm* — Kilpatrick Townsend & Stockton LLP

(57) ABSTRACT

Examples of an image sensor are disclosed. In one example, the image sensor comprises a pixel cell, a switchable optical filter, and a controller. The switchable optical filter is configured to select a optical frequency range and allow incident light of the selected optical frequency range to reach the pixel cell. The controller is configured to operate the switchable optical filter to enable the pixel cell to: receive, at different times, information related to incident light of different optical frequency ranges, and generate, at the different times, intensity measurements of the incident light of different optical frequency ranges.

21 Claims, 20 Drawing Sheets

Graph 910

Graph 912

IMAGE SENSOR WITH SWITCHABLE OPTICAL FILTER

BACKGROUND

The disclosure relates generally to image sensors, and more specifically to pixel cell sensor that can be operated in multiple measurement modes.

A typical image sensor includes a photodiode to sense incident light by converting photons into charges (e.g., electrons or holes). The image sensor further includes a capacitor (e.g., a floating drain node of a transistor) to collect the charges generated by the photodiode during an exposure period. The collected charges can develop a voltage at the capacitor. An image of a scene can be derived from the voltages developed at the capacitors of an array of image sensors.

SUMMARY

The present disclosure relates to image sensors. More specifically, and without limitation, this disclosure relates to an image sensor with a switchable optical filter and a pixel cell, the switchable optical filter being capable of passing different optical frequency ranges of light onto the pixel cell at different times. This disclosure also relates to operating an image sensor, including a switchable optical filter and a pixel cell, to perform at least two different modes of measurement at different times. In a first mode of measurement, an intensity of incident light of a visible optical frequency range is measured for two-dimensional (2D) imaging. In a second mode of measurement, an intensity of incident light of an invisible optical frequency range is measured for three-dimensional (3D) imaging.

In one example, an apparatus is provided. The apparatus includes a pixel cell, a switchable optical filter configured to select a optical frequency range and allow incident light of the selected optical frequency range to reach the pixel cell, and a controller. The controller is configured to operate the switchable optical filter to enable the pixel cell to: receive, at different times, information related to incident light of different optical frequency ranges, and generate, at the different times, intensity measurements of the incident light of different optical frequency ranges.

In one aspect, the controller is configured to, at a first time: operate the switchable optical filter to pass light of a first optical frequency range associated with visible light, and operate the pixel cell to generate intensity measurement of the light of the first optical frequency range. The controller is also configured to, at a second time: operate the switchable optical filter to pass light of a second optical frequency range associated with visible light, and operate the pixel cell to generate intensity measurement of the light of the second optical frequency range. The controller is further configured to, at a third time: operate the switchable optical filter to pass light of a third optical frequency range associated with visible light, and operate the pixel cell to generate intensity measurement of the light of the third optical frequency range.

In one aspect, the controller is configured to operate the cell to compute a pixel value of an image frame based on an average of the intensity measurement of the light of the first optical frequency range, the intensity measurement of the light of the second optical frequency range, and the intensity measurement of the light of the third optical frequency range.

In one aspect, the controller is configured to, at a first time: operate the switchable optical filter to pass light of a first optical frequency range associated with visible light, and operate the pixel cell to generate intensity measurement of the light of the first optical frequency range. The controller is also configured to, at a second time: operate the switchable optical filter to pass light of a second optical frequency range associated with invisible light, and operate the pixel cell to generate intensity measurement of the light of the second optical frequency range.

In one aspect, the controller is further configured to: generate an image pixel value of an object based on the intensity measurement of the light of the first optical frequency range; and perform a distance measurement of the object based on the intensity measurement of the light of the second optical frequency range.

In one aspect, the apparatus further includes an illuminator. The controller is further configured to: operate the illuminator to project the light of the second optical frequency range to the object at a third time preceding the second time; operate the switchable optical filter to pass the light of the second optical frequency range reflected by the object; operate the pixel cell to generate an indication of a fourth time when the light reflected by the object reaches the pixel cell; and perform the distance measurement based on a difference between the third time and the fourth time.

In one aspect, the switchable optical filter includes a filter array including a first filter element and a second filter element, the first filter element configured to pass light of a first optical frequency range and the second filter element configured to pass light of a second optical frequency range. In one aspect, the first filter element is adjacent to the second filter element. The switchable optical filter is configured to: at a first time, move the filter array to allow light to pass through the first filter element to enable the pixel cell to receive light of the first optical frequency range; and at a second time, move the filter array to allow light to pass through the second filter element to reach the pixel cell to receive light of the second optical frequency range. In one aspect, the first filter element is adjacent to the second filter element along a first axis. A dimension of each of the first filter element and the second filter element along the first axis is half of a dimension of the pixel cell along the first axis. The switchable optical filter is configured to move the filter array along the first axis.

In one aspect, the apparatus further includes one or more convergent lens to focus the incident light onto one of the first filter element or the second filter element.

In one aspect, the switchable optical filter further includes a third filter element adjacent to the first filter element along a second axis. A dimension of each of the first filter element and the third filter element along the second axis is half of a dimension of the pixel cell along the second axis. The switchable optical filter is configured to move the filter array along the second axis.

In one aspect, the switchable optical filter further comprises a first actuator configured to move the filter array along the first dimension and a second actuator configured to move the filter array along the second dimension.

In one aspect, the first filter element and the second filter element form a stack structure. At a first time, the first filter element is configured to pass light of the first optical frequency range, and the second filter element is configured to pass light of a third optical frequency range including the first optical frequency range. At a second time, the second filter element is configured to pass light of the second optical frequency range, and the first filter element is configured to pass light of a fourth optical frequency range including the second optical frequency range. In one aspect, the first filter element includes a first electrochromic material; and wherein the second filter element includes a second electrochromic material.

In one example, an apparatus is provided. The apparatus includes a pixel cell array that includes a set of pixel cells. The apparatus further includes a switchable optical filter array. The switchable optical filter array includes a first set of filter elements and a second set of filter elements, the first set of filter elements configured to pass light of a first optical frequency range, the second set of filter elements configured to pass light of a second optical frequency range. The apparatus further includes a controller configured to operate the switchable optical filter array to enable each pixel cell of the set of pixel cells to: at a first time, receive the light of the first optical frequency range passed by the first set of filter elements, and generate first intensity measurements based on the received light of the first optical frequency range; and at a second time, receive the light of the second optical frequency range passed by the second set of filter elements, and generate second intensity measurements based on the received light of the second optical frequency range.

In one aspect, the controller is configured to, at the first time: move the switchable optical filter array to align the first set of filter elements with the set of pixel cells. The controller is also configured to, at the second time: move the switchable optical filter array to align the second set of filter elements with the set of pixel cells.

In one aspect, the controller is configured to, at the first time: apply one or more first signals to the switchable optical filter array to change a transmittance of the first set of filter elements for the light of the first optical frequency range. The controller is also configured to, at the second time: apply one or more second signals to the switchable optical filter array to change a transmittance of the second set of filter elements for the light of the second optical frequency range.

In one example, a method is provided. The method comprises: operating a switchable optical filter to pass light of a first optical frequency range associated with visible light; generating first pixel values based on outputs from a set of pixel cells of a pixel cell array that receives information about the light of the first optical frequency range, the first pixel values representing an intensity distribution of the light of the first optical frequency range; generating a first image frame based on the first pixel values; operating the switchable optical filter to pass light of a second optical frequency range associated with invisible light; generating second pixel values based on outputs from the set of pixel cells of the pixel cell array that receives information about the light of the second optical frequency range, the second pixel values representing a distribution of distances between a surface of an object and the set of pixel cells; and generating a second image frame based on the second pixel values.

In one aspect, operating the switchable optical filter to pass the light of the first optical frequency range associated with visible light comprises: operating the switchable optical filter to pass a first color component of the visible light at a first time and operating the switchable optical filter to pass a second color component of the visible light at a second time.

In one aspect, operating the switchable optical filter to pass the light of the first optical frequency range associated with visible light comprises configuring a transmittance of the switchable optical filter with respect to the visible light; and operating the switchable optical filter to pass the light of the second optical frequency range associated with invisible light comprises configuring a transmittance of the switchable optical filter with respect to the invisible light.

BRIEF DESCRIPTION OF THE DRAWINGS

Illustrative embodiments are described with reference to the following figures.

Figure 1A:
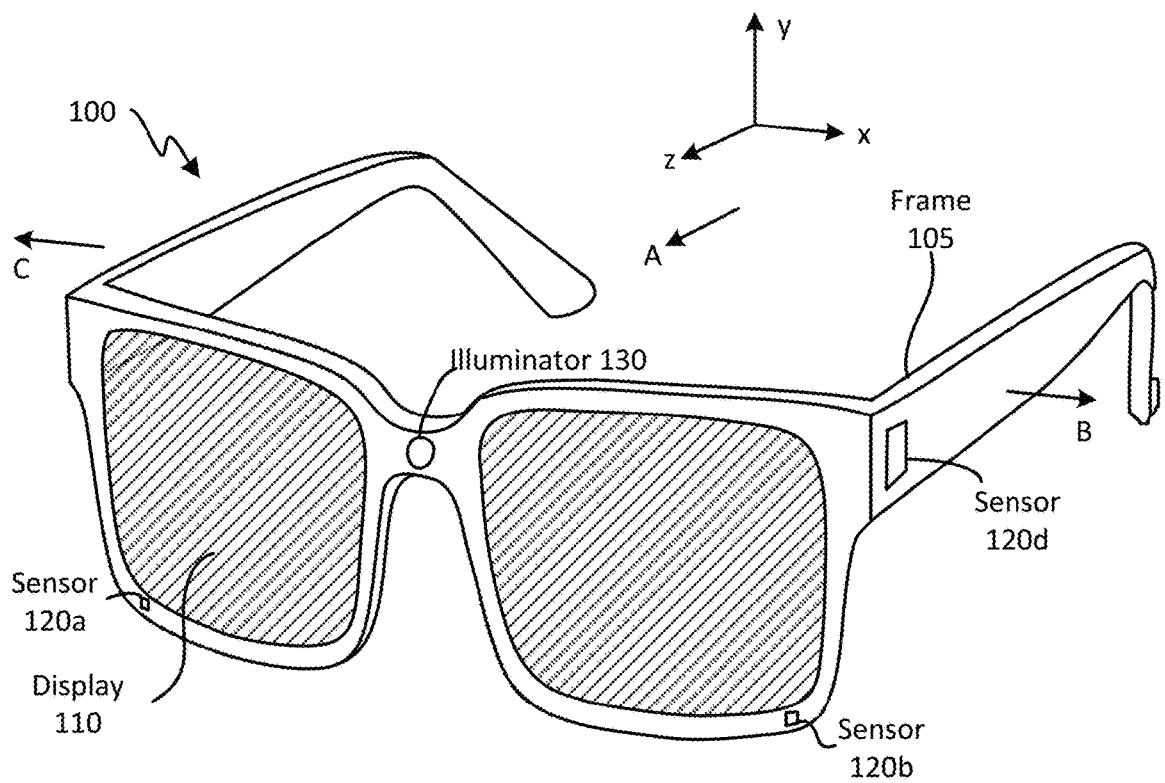
FIGS. 1A and 1B are diagrams of an embodiment of a near-eye display.
Figure 1A:
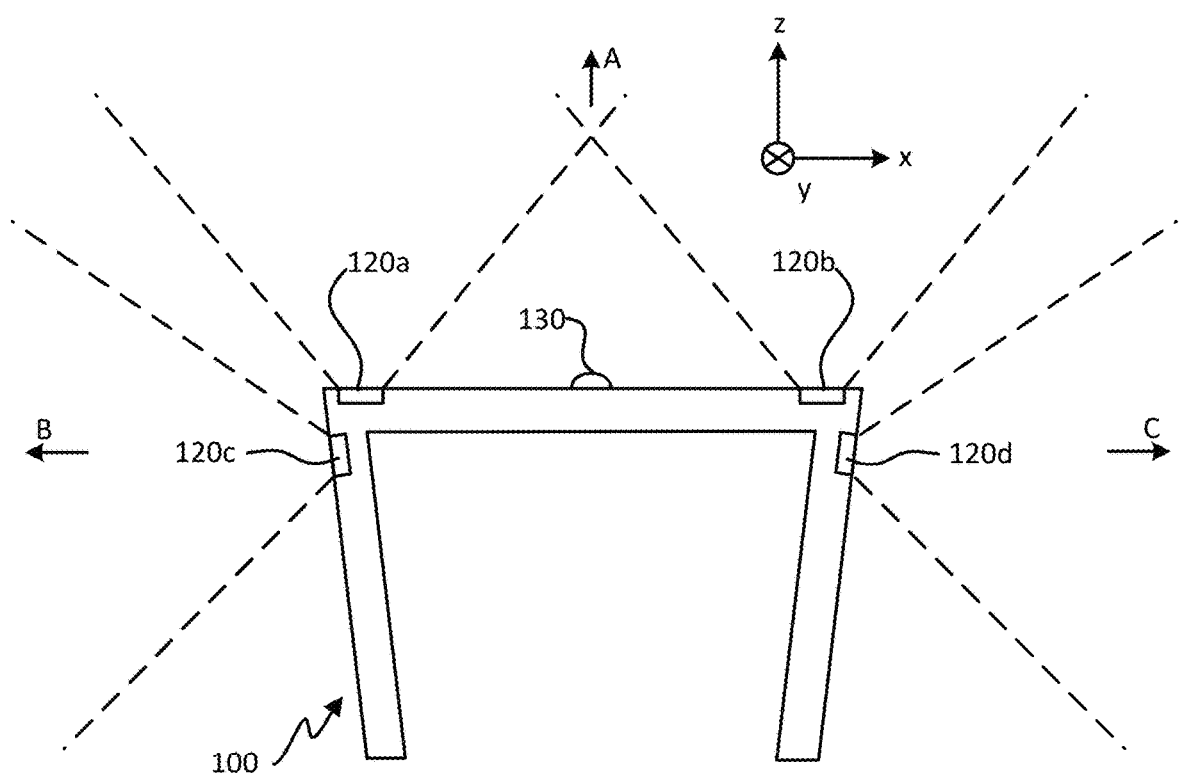

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A typical image sensor includes an optical filter array and an array of pixel cells. The optical filter array may select an optical frequency range of light incident upon the array of pixel cells by filtering incident light components that are within the selected optical frequency range. Each pixel cell may have a photodiode to sense incident light by converting photons into charges (e.g., electrons or holes). Each pixel cell may also include a floating drain node (or other charge storage device) configured as a capacitor to accumulate the charges generated by the photodiode during an exposure period. The accumulated charges can develop a voltage at the capacitor, and a pixel value can be generated based on the voltage. The pixel value can represent an intensity of light of the selected optical frequency range received by the pixel cell. An image comprising an array of pixels can be derived from the digital outputs of the voltages output by an array of pixel cells.

An image sensor can be used to perform different modes of imaging, such as 2D and 3D sensing. For 2D sensing, the optical filter array can include a color filter array pattern (e.g., a Bayer filter) to allow visible light of different optical frequency ranges and colors (e.g., red, green, and blue colors) to a set of pixel cells assigned for 2D sensing. Each of the set of pixel cells may be configured to measure the intensity of visible light of a pre-determined optical frequency range/color (e.g., one of red, green, or blue colors). To perform 2D sensing, a photodiode at a pixel cell can generate charges at a rate that is proportional to an intensity of light (of a pre-determined optical frequency range set by the color filter array pattern) incident upon the pixel cell, and the quantity of charges accumulated in an exposure period can be used to represent the intensity of light. The quantity of charges can be represented by the voltage developed at the capacitor that accumulates the charges. The voltage can be sampled and quantized by an analog-to-digital converter (ADC) to generate an output corresponding to the intensity of light of the pre-determined optical frequency range. An image pixel value can be generated based on the outputs from multiple pixel cells representing intensity of light of different optical frequency ranges/color (e.g., red, green, and blue colors).

On the other hand, to perform 3D sensing, the pixel cells outputs can be used to perform time-of-flight measurement to measure a distance between an object and the image sensor. For example, an illuminator may project light pulses of a pre-determined optical frequency range onto the object, which can reflect the projected light back to the image sensor. The optical filter array may include filter elements to allow only light of the pre-determined optical frequency range to reach a set of pixel cells. Each of the pixel cells can also generate an output indicating reception of the reflected light (e.g., based on a change in the voltage at the capacitor), and the output can be timestamped. Assuming that the illuminator is very close to the image sensor, the duration of a time period between when the illuminator projects a light pulse and when the reflected light is received by the photodiode can be determined by, for example, a time-to-digital converter (TDC), a time-to-analog converter (TAC), etc. The duration can be used to estimate a distance between the object and the image sensor. Typically, to improve the sensor's sensitivity for more accurate 3D sensing, light pulses associated with the invisible optical frequency range (e.g., infra-red light pulses, etc.) are used to perform the time-of-flight measurements. For example, the illuminator may be configured to emit one or more infra-red light pulses, and the optical filter array may allow only infra-red light to reach the set of pixel cells used for 3D sensing.

A pixel cell array can be used to generate an image of a scene. In some examples, a subset of the pixel cells within the array can be used to perform 2D sensing of the scene, and another subset of the pixel cells within the array can be used to perform 3D sensing of the scene. The fusion of 2D and 3D imaging data are useful for many applications that provide virtual-reality (VR), augmented-reality (AR) and/or mixed reality (MR) experiences. For example, a wearable VR/AR/MR system may perform scene reconstruction of an environment in which the user of the system is located. Based on the reconstructed scene, the VR/AR/MR can generate display effects to provide interactive experience. To reconstruct a scene, a subset of pixel cells within a pixel cell array can perform 3D sensing to, for example, identify a set of physical objects in the environment and determine the distances between the physical objects and the user. Another subset of pixel cells within the pixel cell array can perform 2D sensing to, for example, capture visual attributes including textures, colors, and reflectivity of these physical objects. The 2D and 3D image data of the scene can then be merged to create, for example, a 3D model of the scene including the visual attributes of the objects. As another example, a wearable VR/AR/MR system can also perform a head tracking operation based on a fusion of 2D and 3D image data. For example, based on the 2D image data, the VR/AR/AR system can extract certain image features to identify an object. Based on the 3D image data, the VR/AR/AR system can track a location of the identified object relative to the wearable device worn by the user. The VR/AR/AR system can track the head movement based on, for example, tracking the change in the location of the identified object relative to the wearable device as the user's head moves.

Although a pixel cell array can have different sets of pixel cells used for sensing lights of different intensities for 2D and 3D imaging, such arrangements can pose a number of challenges. First, because only a subset of the pixel cells of the array is used to perform either 2D imaging or 3D imaging (and for 2D imaging, different cells within the subset are used to sense lights of different colors), the spatial resolutions of both of the 2D image and 3D image are lower than the maximum spatial resolution available at the pixel cell array. Although the resolutions can be improved by including more pixel cells, such an approach can lead to increases in the form-factor of the image sensor as well as power consumption, both of which are undesirable especially for a wearable device. Moreover, the pixel cells assigned to measure light of different ranges (for 2D and 3D imaging) are not collocated, and each pixel cell may capture information of different spots of a scene. For example, a pixel cell that receives green color light and a pixel cell that receives red color light, both for 2D imaging, may capture information of different spots of a scene. Also, a pixel cell that receives visible light (for 2D imaging) and a pixel cell that receives invisible light (for 3D imaging) may also capture information of different spots of the scene. The output of these pixel cells cannot be simply merged to generate the 2D and 3D images. The lack of correspondence between the output of the pixel cells due to their different locations can be worsened when the pixel cell array is capturing 2D and 3D images of a moving object. While there are processing techniques available to correlate different pixel cell outputs to generate pixels for a 2D image, and to correlate between 2D and 3D images (e.g., interpolation), these techniques are typically computation-intensive and can also increase power consumption.

This disclosure relates to an image sensor comprising a pixel cell, a switchable optical filter, and a controller. The switchable optical filter may select an optical frequency range and allow incident light of the selected optical frequency range to reach the pixel cell. The controller may operate the switchable optical filter to enable the pixel cell to receive, at different times, incident light of different optical frequency ranges, and to generate intensity measurements of the incident light of different optical frequency ranges at the different times.

With examples of the present disclosure, the pixel cell can be operated to perform 2D sensing (e.g., by operating the switchable optical filter to allow visible light to reach the pixel cell) and to perform 3D sensing (e.g., by operating the switchable optical filter to allow invisible light to reach the pixel cell) at different times. For 2D sensing, the same pixel cell can also be operated to perform intensity measurements of different components of visible light (e.g., red color component, blue color component, green color component, etc.) at different times. This can improve correspondence between a 2D image and a 3D image, and correspondence between different color components of a 2D image. Moreover, given that every pixel cell is used to generate the 2D or 3D image, the full spatial resolution of the pixel cell array can be utilized. As a result, the spatial resolutions of the images can also be improved, while the form factor and power consumption of the image sensor can be reduced.

Examples of the present disclosure may include, or be implemented in conjunction with, an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel cell array comprising an array of pixel cells and configured to generate image data representing different fields of views along different directions. For example, sensors 120a and 120b may be configured to provide image data representing two field of views towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such arrangement, the accuracy and robustness of tracking a location of the user within the physical environment can be improved.

In some embodiments, near-eye display 100 may further include one or more active illuminator 130 to project light into the physical environment. The light projected can be associated with different frequency spectrums (e.g., visible light, infra-red light, ultra-violet light, etc.), and can serve various purposes. For example, illuminator 130 may project light and/or light patterns in a dark environment (or in an environment with low intensity of infra-red light, ultra-violet light, etc.) to assist sensors 120a-120d in capturing 3D images of different objects within the dark environments. The 3D images may include, for example, pixel data representing the distances between the objects and near-eye display 100. The distance information can be used to, for example, construct a 3D model of the scene, to track a head movement of the user, to track a location of the user, etc. As to be discussed in more details below, sensors 120a-120d can be operated in a first mode for 2D sensing and in a second mode for 3D sensing at different times. The 2D and 3D image data can be merged and provided to a system to provide a more robust tracking of, for example, the location of the user, the head movement of the user, etc.

Figure 1B:
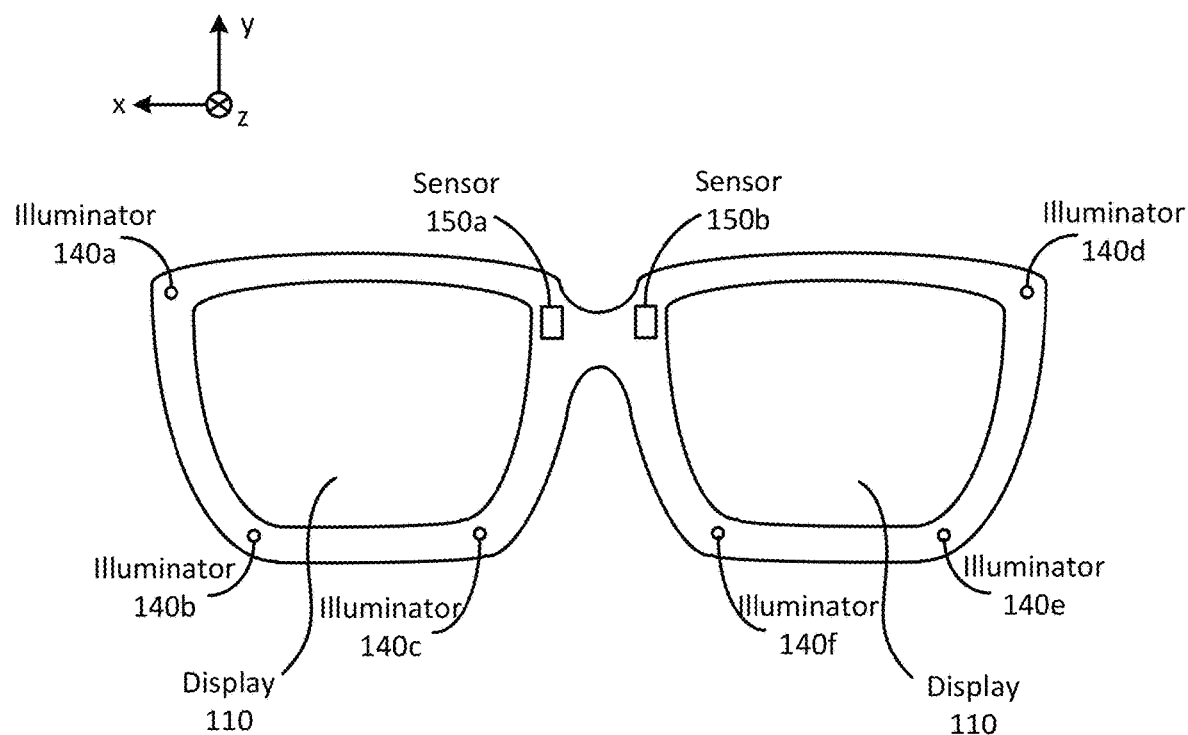
Figure 1B:
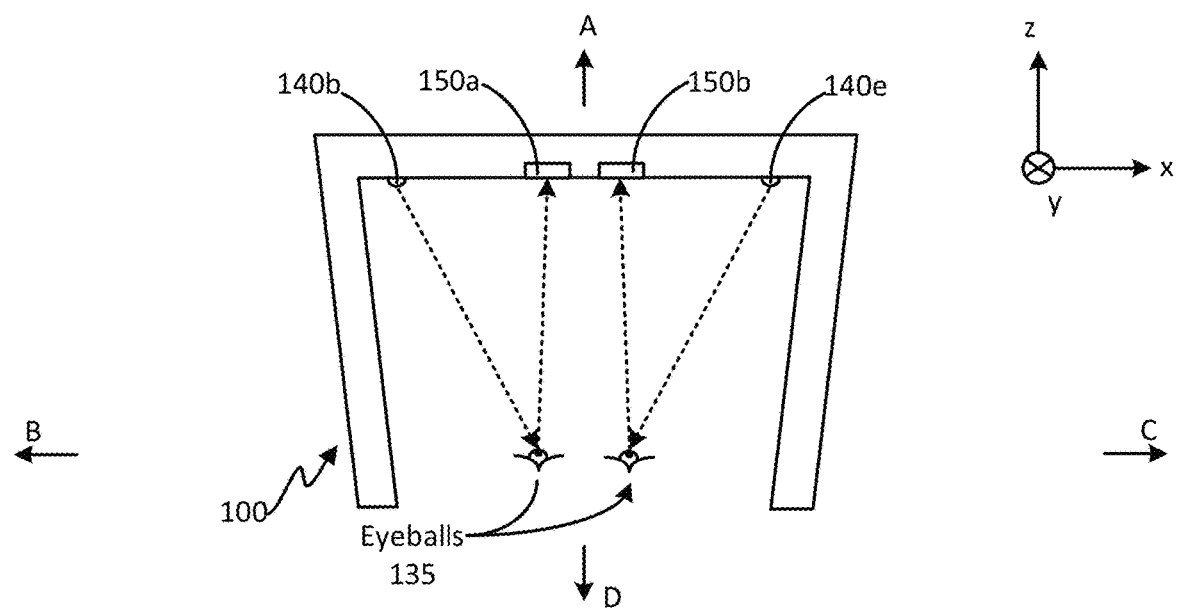

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain optical frequency range (e.g., NIR) towards direction D (which is opposite to direction A of FIG. 1A). The emitted light may be associated with a certain pattern, and can be reflected by the left eyeball of the user. Sensor 150a may include a pixel cell array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b.

Sensor 150*b* may also include a pixel cell array to generate an image of the reflected pattern. Based on the images of the reflected pattern from sensors 150*a* and 150*b*, the system can determine a gaze point of the user, and update the image data provided to display 100 based on the determined gaze point to provide an interactive experience to the user. In some examples, image sensors 150*a* and 150*b* may include same pixel cells as sensors 120*a*-120*d*.

Figure 2:
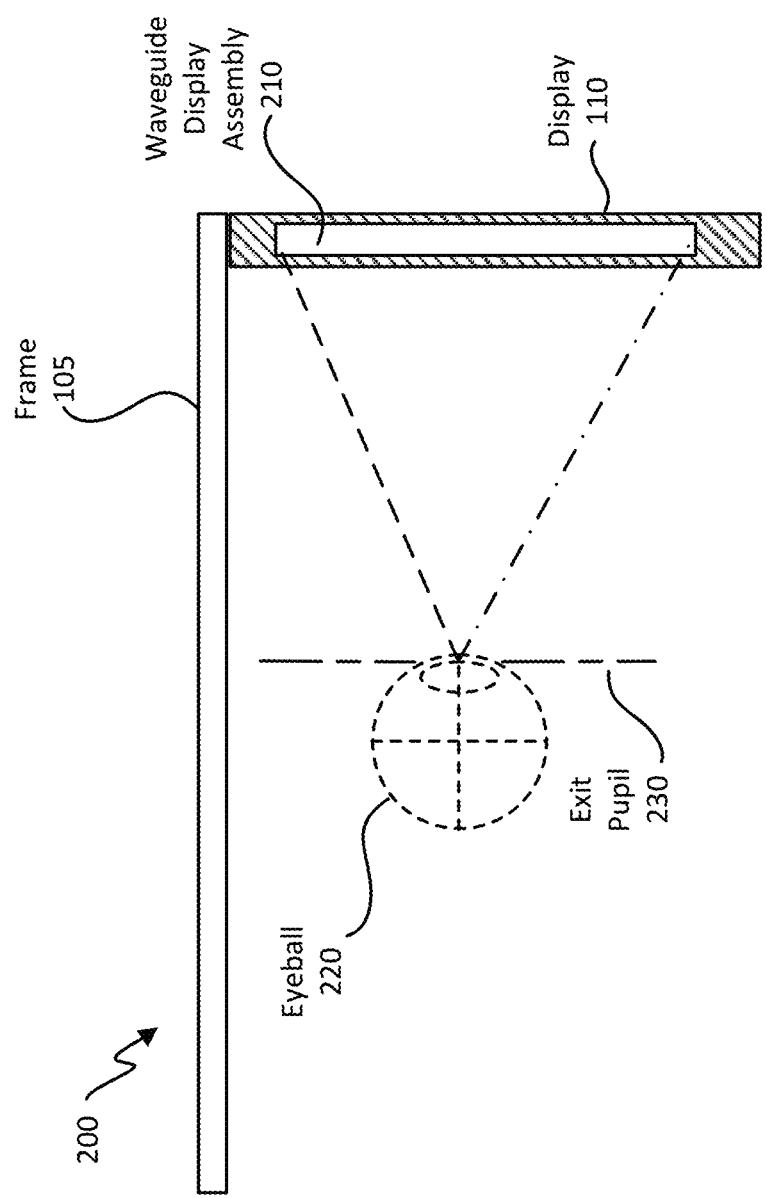
FIG. 2 is an embodiment of a cross section of the near-eye display.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
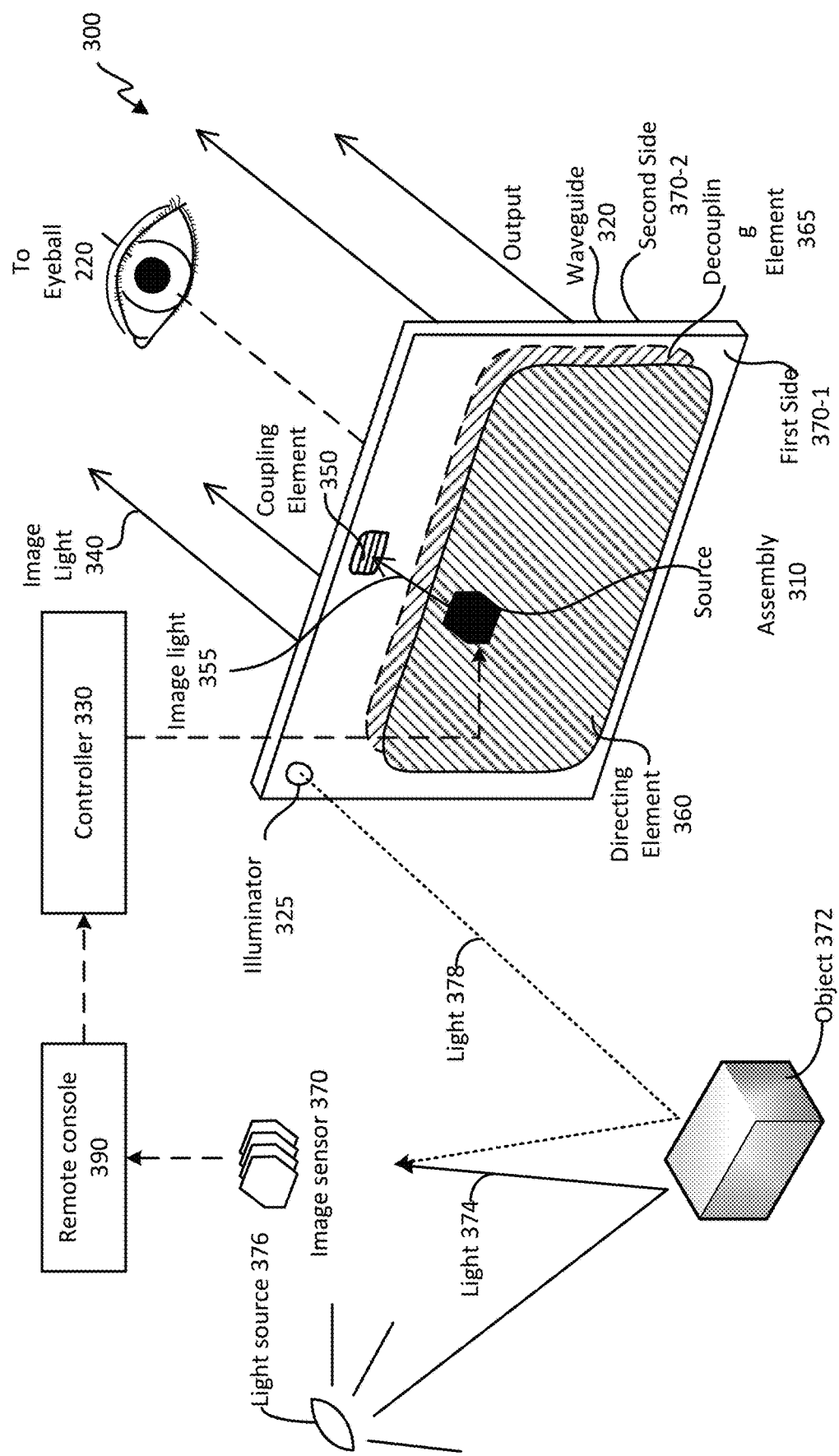
FIG. 3 illustrates an isometric view of an embodiment of a waveguide display.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, an illuminator 325, and a controller 330. Illuminator 325 can include illuminator 130 of FIG. 1A. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120*a*-120*d* of FIG. 1A. Image sensors 120*a*-120*d* can be operated to perform 2D sensing and 3D sensing of, for example, an object 372 in front of the user (e.g., facing first side 370-1). For 2D sensing, each pixel cell of image sensors 120*a*-120*d* can be operated to generate pixel data representing an intensity of light 374 generated by a light source 376 and reflected off object 372. For 3D sensing, each pixel cell of image sensors 120*a*-120*d* can be operated to generate pixel data representing a time-of-flight measurement for light 378 generated by illuminator 325. For example, each pixel cell of image sensors 120*a*-120*d* can determine a first time when illuminator 325 is enabled to project light 378 and a second time when the pixel cell detects light 378 reflected off object 372. The difference between the first time and the second time can indicate the time-of-flight of light 378 between image sensors 120*a*-120*d* and object 372, and the time-of-flight information can be used to determine a distance between image sensors 120*a*-120*d* and object 372. Image sensors 120*a*-120*d* can be operated to perform 2D and 3D sensing at different times, and provide the 2D and 3D image data to a remote console 390 that may be (or may be not) located within waveguide display 300. The remote console may combine the 2D and 3D images to, for example, generate a 3D model of the environment in which the user is located, to track a location and/or orientation of the user, etc. The remote console may determine the content of the images to be displayed to the user based on the information derived from the 2D and 3D images. The remote console can transmit instructions to controller 330 related to the determined content. Based on the instructions, controller 330 can control the generation and outputting of image light 355 by source assembly 310, to provide an interactive experience to the user.

Figure 4:
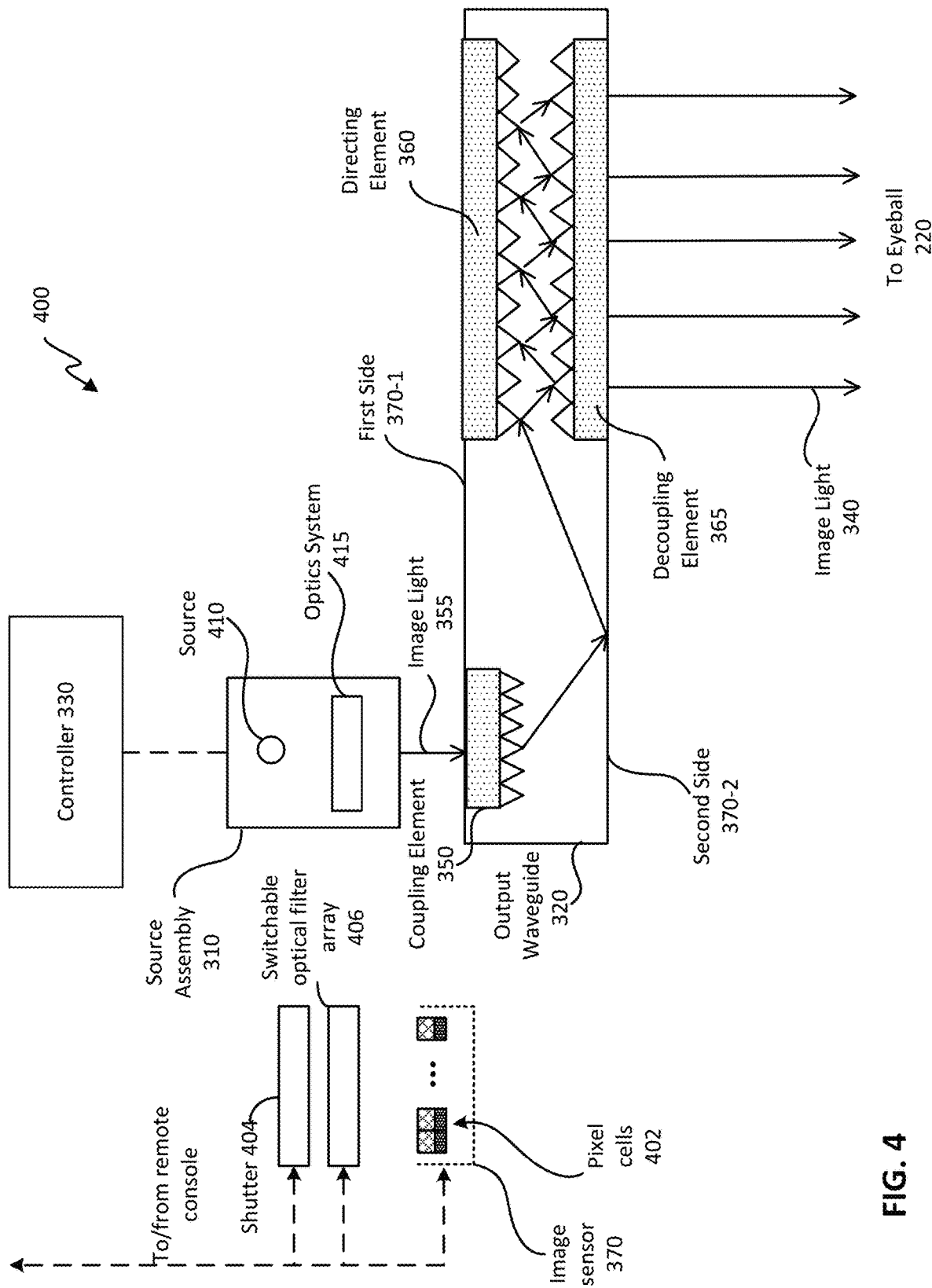
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 and a switchable optical filter array 406 interposed between the set of pixel cells 402 and the physical environment. Mechanical shutter 404 can control the exposure of the set of pixel cells 402. In some embodiments, the mechanical shutter 404 can be replaced by an electronic shutter gate, as to be discussed below. Switchable optical filter array 406 can control an optical frequency range of light the set of pixel cells 402 is exposed to, as to be discussed below. Each of pixel cells 402 may correspond to one pixel of the image. Although not shown in FIG. 4, it is understood that each of pixel cells 402 may also be overlaid with a filter to control the optical frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
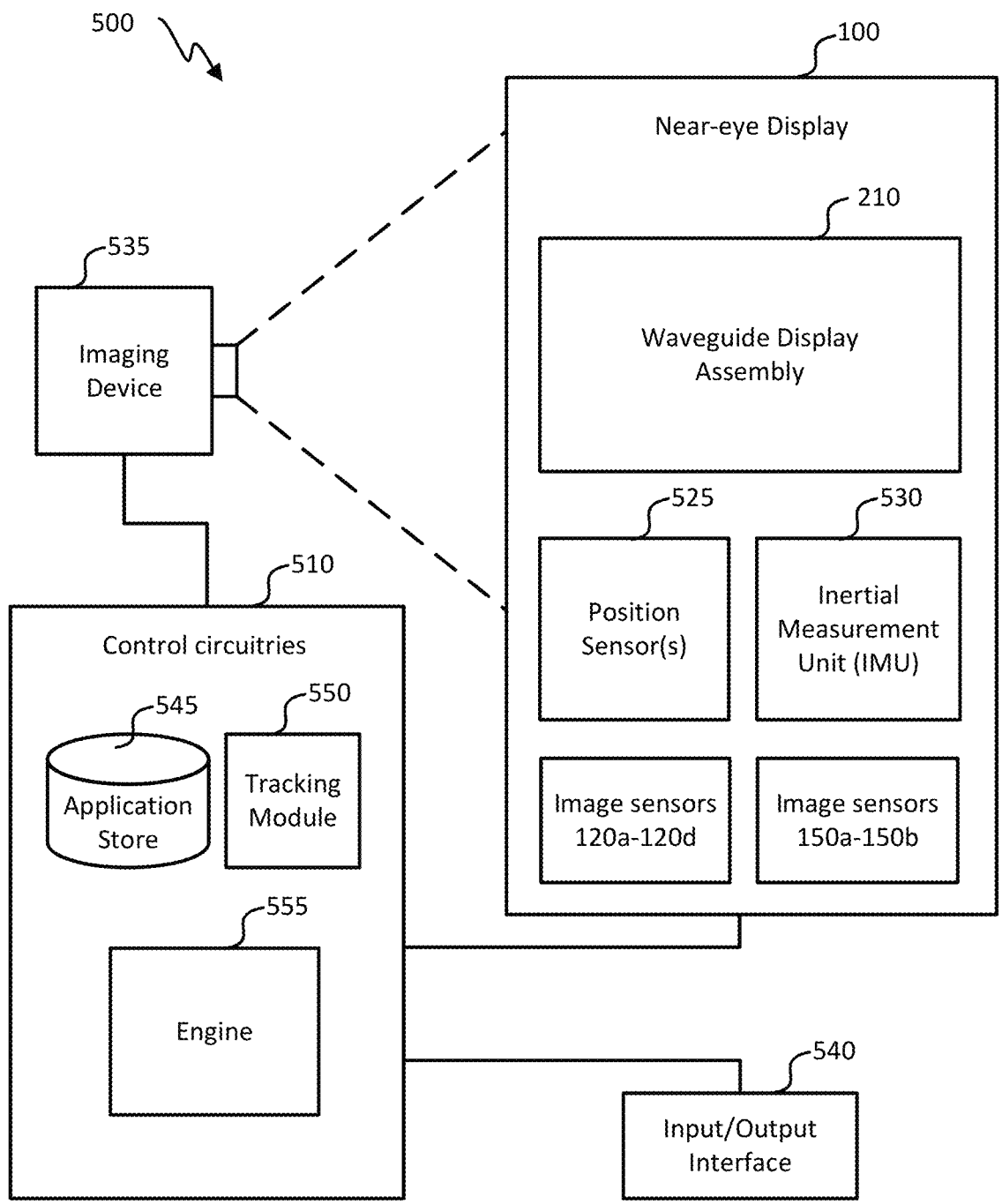
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating 2D image data and 3D image data of a physical environment in which the user is located to track the location and head movement of the user. Imaging device 535 may further include, for example, image sensors 150a-150b of FIG. 1B for generating image data (e.g., 2D image data) for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provides media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback application, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), a gaze point of the user (e.g., based on image data provided by imaging device 535), a distance between an object and user (e.g., based on image data provided by imaging device 535).

Figure 6:
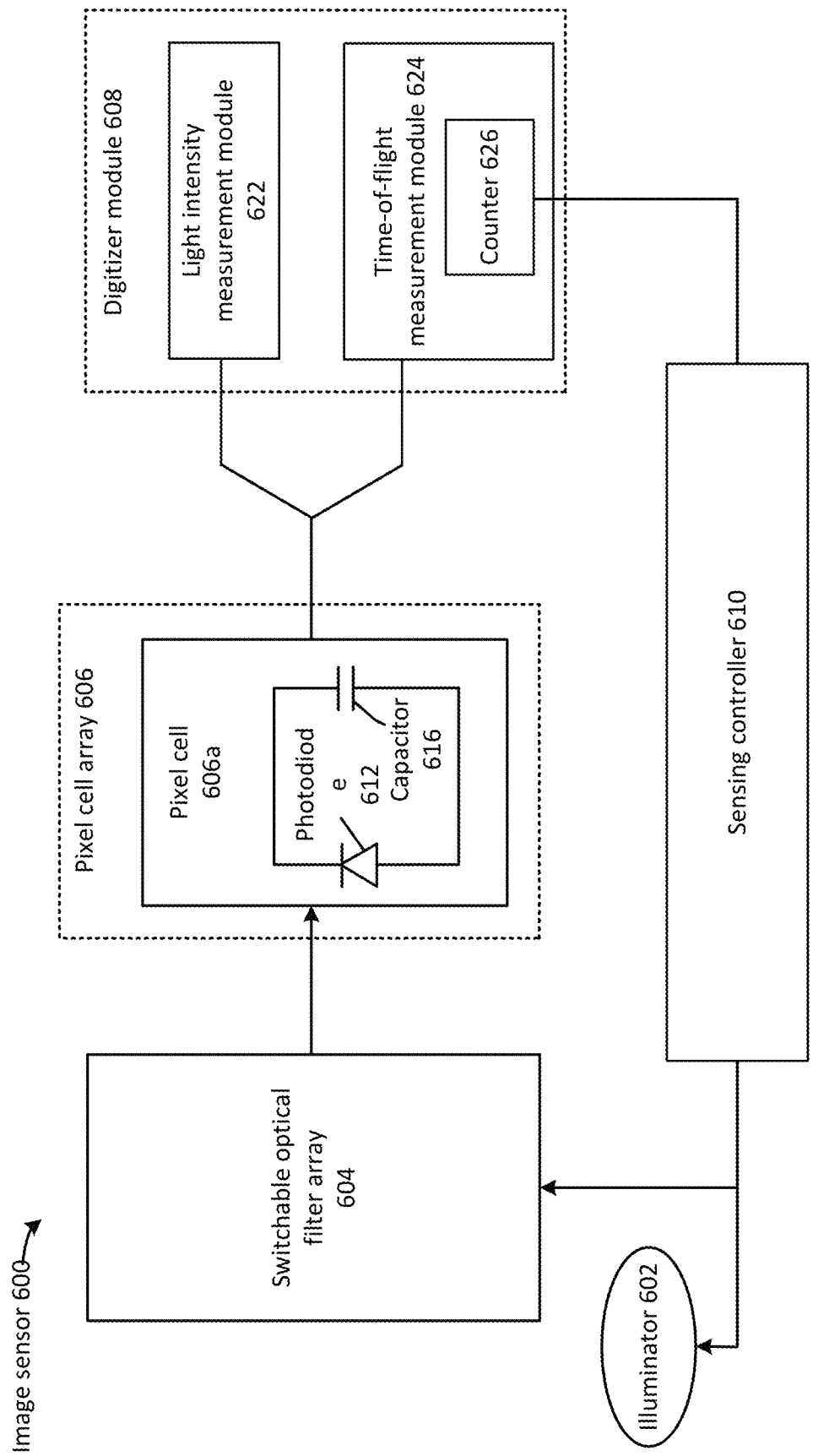
FIG. 6 illustrates an example of an image sensor.

FIG. 6 illustrates an example of an image sensor 600. Image sensor 600 can use the same pixel cell to perform measurements for different color components of incident light for 2D sensing. Image sensor 600 can also use the same pixel cell for both 2D sensing and 3D sensing. Image sensor 600 can be part of near-eye display 100, and can provide 2D and 3D image data to control circuitries 510 of FIG. 5 to control the display content of near-eye display 100. In the example of FIG. 6, image sensor 700 may include an illuminator 602, a switchable optical filter array 604, a pixel cell array 606 including a pixel cell 606a, and a digitizer module 608. Illuminator 602 may be an infra-red illuminator that can generate light pulses and can include, for example, a laser, a light emitting diode (LED), etc. Switchable optical filter array 604 can be controlled to transmit a certain frequency band of light (e.g., a color component of visible light, invisible light including ultra-violet light, infra-red light, etc.) to pixel cell 606a. Pixel cell 606a may receive light through switchable optical filter array 604, and can generate an output representing an intensity of the received light. For example, pixel cell 606a may include a photodiode 612 to generate charges responsive to receiving the light in an exposure period. Pixel cell 606 may also include a capacitor 616 to accumulate the charges generated by photodiode 612 within the exposure period to generate a voltage. Digitizer module 608 may include a light intensity measurement module 622 and a time-of-flight measurement module 624 to generate a pixel value based on the voltage at capacitor 616.

Figure 7A:
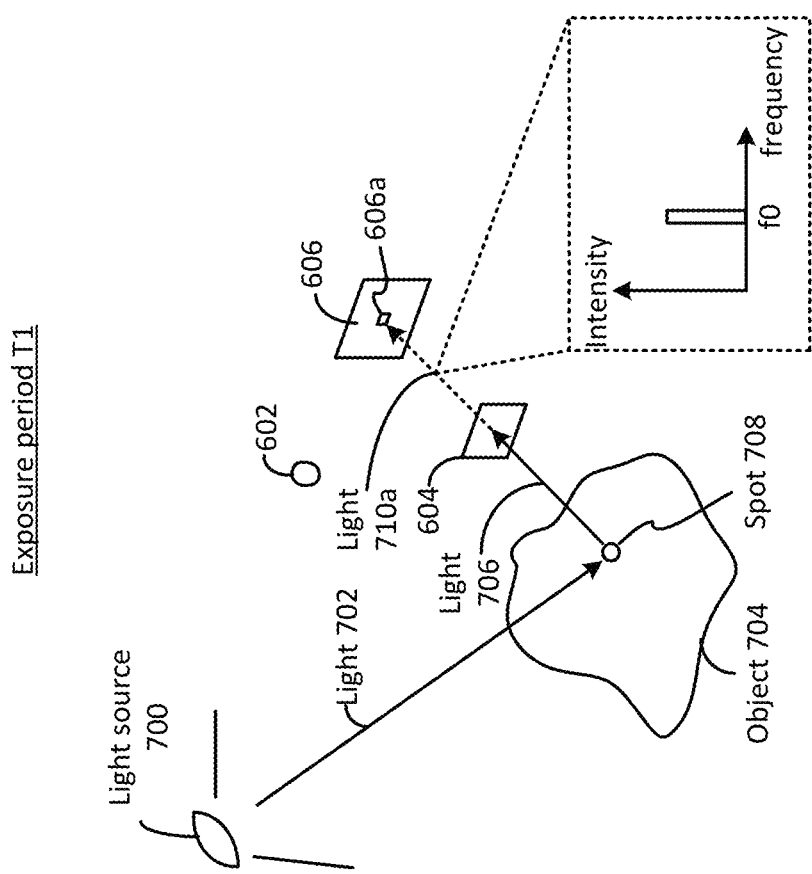
FIG. 7A, FIG. 7B, FIG. 7C, FIG. 7D, and FIG. 7E illustrate examples of operations of the image sensor of FIG. 6.
Figure 7B:
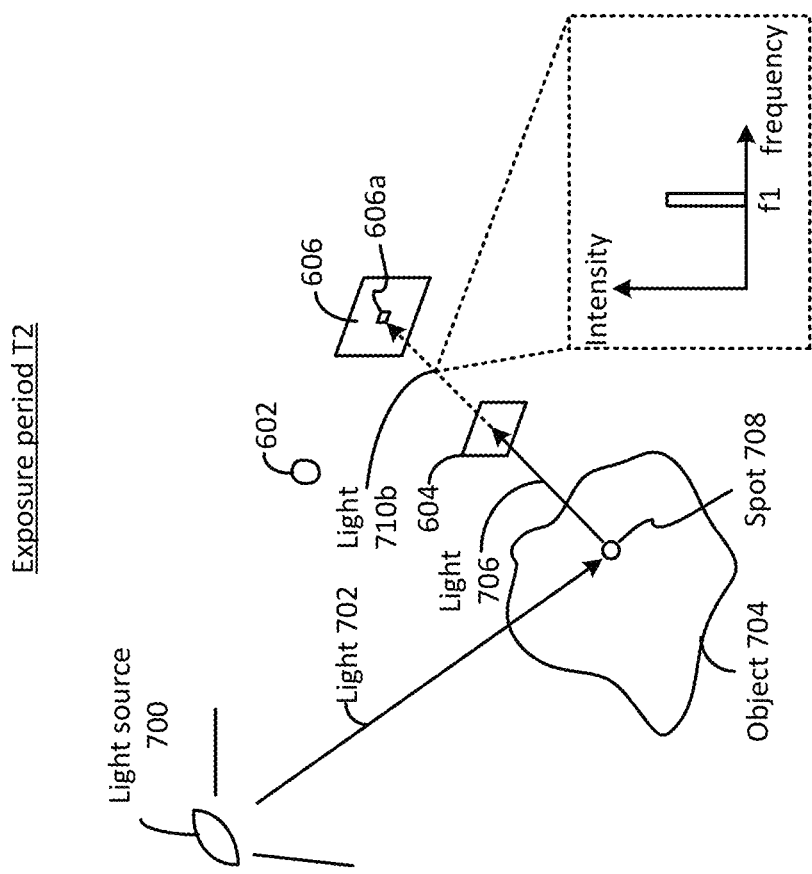
Figure 7C:
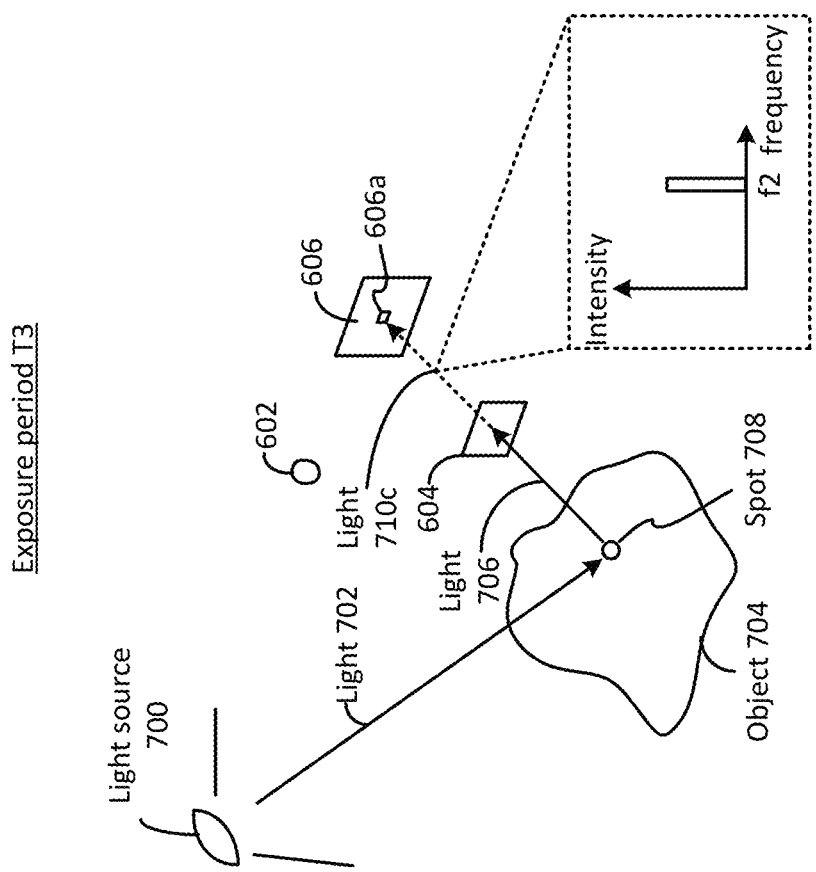

Image sensor 600 further includes a sensing controller 610 to control different components of image sensor 600 to perform 2D and 3D imaging of an object at different times based on a time. Reference is now made to FIGS. 7A, 7B, 7C, and 7D, which illustrate examples of operations of image sensor 600 for 2D and 3D imaging. FIGS. 7A-7C illustrate an example of operations for 2D imaging. For 2D imaging, sensing controller 610 can disable illuminator 702, and control switchable optical filter array 604 to pass certain visible light of different optical frequency ranges at different exposure periods. For example, referring to FIG. 7A, at exposure period T1, visible light source 700 (e.g., a light bulb, the sun, or other sources of ambient visible light) can project visible light 702 onto an object 704. Visible light 706 can be reflected off a spot 708 of object 704 and enter switchable optical filter array 604. Sensing controller 610 can control switchable optical filter array 604 to filter visible light 706 to pass visible light component of optical frequency range f0 (while rejecting visible light components of other optical frequency ranges), to produce filtered light 710a. Optical frequency range f0 may correspond to a first color component of visible light 706 (e.g., a red color component with an optical frequency range of 400-484 Tera-Hz (THz), which can correspond to a wavelength range of 620-750 nanometers (nm)) reflected off spot 708. Filtered light 710a can be captured by pixel cell 606a, which can generate a voltage representing the intensity of the first color component and provide the voltage to light intensity measurement module 622. Light intensity measurement module 622 may include an analog-to-digital converter (ADC), to sample and quantize the voltage to generate a digital value representing the intensity of the first color component of visible light 706.

Also, referring to FIG. 7B, at exposure period T2, sensing controller 610 can control switchable optical filter array 604 to filter visible light 706 to pass visible light component of optical frequency range f1 (while rejecting visible light components of other optical frequency ranges), to produce filtered light 710b. Optical frequency range f1 may correspond to a second color component of visible light 706 (e.g., a green color component with an optical frequency range of 526-606 THz, which can correspond to a wavelength range of 495-570 nm) reflected off spot 708. Filtered light 710b can also be captured by pixel cell 606a, which can generate a voltage representing the intensity of the second color component and provide the voltage to light intensity measurement module 622. The ADC in light intensity measurement module 622 can sample and quantize the voltage to generate a digital value representing the intensity of the second color component of visible light 706.

Moreover, referring to FIG. 7C, at exposure period T3, sensing controller 610 can control switchable optical filter array 604 to filter visible light 706 to pass visible light component of optical frequency range f2 (while rejecting visible light components of other optical frequency ranges), to produce filtered light 710c. Optical frequency range f2 may correspond to a third color component of visible light 706 (e.g., a blue color component with an optical frequency range of 606-668 THz, which can correspond to a wavelength range of 450-495 nm) reflected off spot 708 Filtered light 710c can also be captured by pixel cell 606a, which can generate a voltage representing the intensity of the second color component and provide the voltage to light intensity measurement module 622. The ADC in light intensity measurement module 622 can sample and quantize the voltage to generate a digital value representing the intensity of the third color component of visible light 706.

After obtaining the digital values representing the intensities of the first, second, and third components of visible light 706, light intensity measurement module 622 can generate a pixel value for an 2D image frame depicting object 706 by combining the three digital values. The combination of the digital values can be based on various factors including, for example, the color model and color space being used to represent the image. In some examples, the pixel value can be generated by an average of the three digital values.

Figure 7D:
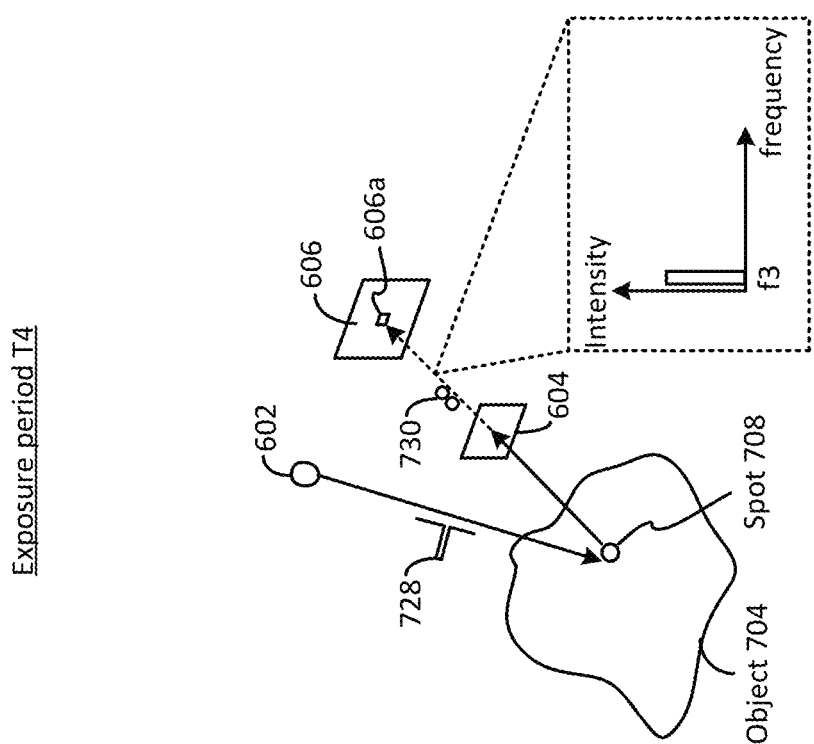

Furthermore, image sensor 600 can also perform 3D imaging of object 704 at a different time from when 2D imaging is performed. Referring to FIG. 7D, at an exposure time T4 for 3D imaging, sensing controller 610 can control illuminator 702 to project an infra-red pulse 728, including infra-red photons 730, onto object 704. Infra-red pulse 728 can have an optical frequency range of f3 which can be, for example, between 300 Gigahz (GHz) to 430 THz. Infra-red photons 730 can reflect off object 704 and propagate towards pixel cell array 606. To detect infra-red photons 730, and to distinguish photons from the ambient light, sensing controller 610 can control switchable optical filter array 604 to only allow light of the optical frequency range of f3 to pass through while rejecting light of other optical frequency ranges. Infra-red photons 730 can go through switchable optical filter array 604 to reach pixel cell 606a. Pixel cell 606a can generate an indication of reception of infra-red photons 730 (e.g., based on a voltage change at capacitor 616 as photodiode 612 generates additional charges in response to receiving infra-red photons 730). The indication can be forwarded to time-of-flight measurement module 624, which can determine a time-of-flight of infra-red photons 730 from the time when the photons exit illuminator 602 to the time when the photons enter pixel cell 606a. Based on the time-of-flight and the speed of movement of infra-red photons, the distance between pixel cell 606a and spot 708 of object 708 can be determined. Each pixel cell of pixel cell array 606 can be used to measure a distance between the pixel cell and a spot of object 704. Based on the information provided by each pixel cell, a 3D image of object 708 can be generated.

There are different ways by which time-of-flight measurement module 724 can determine a time-of-flight of infra-red photons 730. There are different ways by which time-of-flight measurement module 624 can determine a time-of-flight of the infra-red pulse. Referring back to FIG. 6, one way is using counter 626 to generate a count to represent the time-of-flight. For example, as soon as sensing controller 610 controls illuminator 702 to project infra-red pulse 628, sensing controller 610 can start counter 626 to count up (or down) as time elapses. When time-of-flight measurement module 624 receives the indication of detection of infra-red photons 730 from pixel cell 606a, counter 626 can be stopped, and the count value can be used to estimate the time-of-flight of photons 730. As another example, time-of-flight measurement module 624 may include one or more delay lines (not shown in FIG. 6). For example, at the same time when the infra-red pulse is projected, another infra-red pulse can also be fed through the one or more delay lines, each of which can be associated with a pre-determined propagation delay. The timing of outputs of the delay lines can be compared against the timing of the indication of detection of infra-red photons 730 provided by pixel cell 606a using, for example, a set of phase detectors. The phase detector outputs can also be used to estimate time-of-flight. For example, the phase detectors may indicate that reflected infra-red pulse arrives at a time before the output of a first delay line associated with a first propagation delay and after the output of a second delay line associated with a second propagation delay. Based on the indication, it can be estimated that the time-of-flight is between the first propagation delay and the second propagation delay. As yet another example, a time-to-analog converter (TAC), which generates a ramping voltage that increases or decreases with time, can also be used to perform the time-of-flight measurement. For example, the TAC can be controlled to start the ramping voltage at a time point when infra-red pulse is projected, and can be stopped when the ramping voltage crosses the voltage at the capacitor, and the time-of-flight measurement can be performed based on the voltage output (or a digital value representing the voltage output) of the TAC when the ramping stops.

Figure 7E:
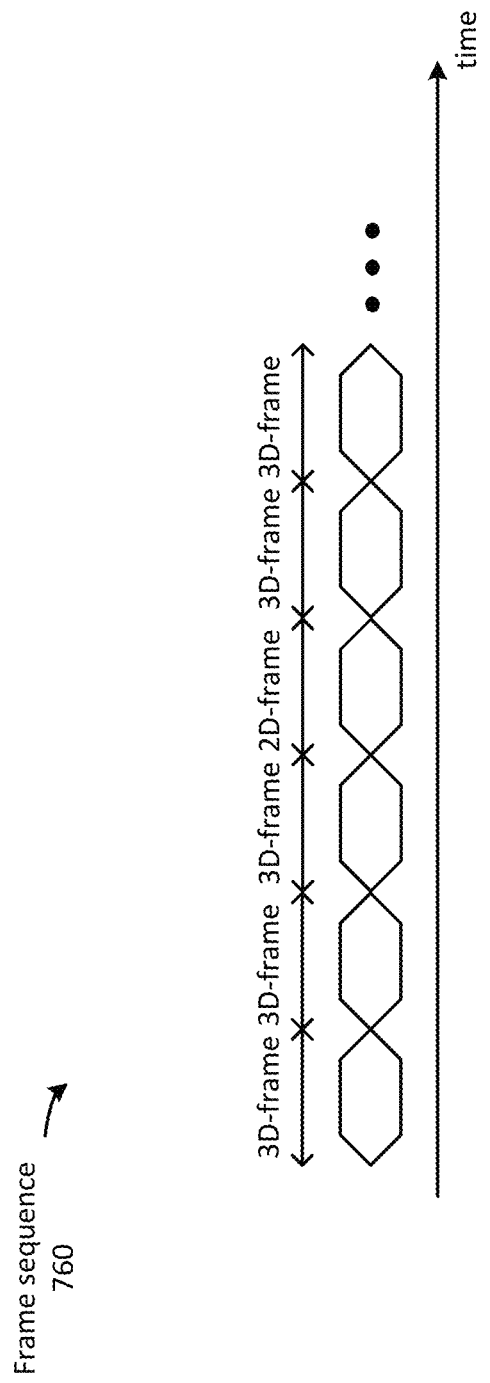

As discussed above, image sensor 600 can be configured to perform 2D sensing and 3D sensing operations based on a time-multiplexing scheme. The entire pixel cell array can be controlled to perform 2D sensing and 3D sensing operations to generate 2D image frames and 3D image frames at different times. Moreover, when performing 2D sensing, the entire pixel cell array can be controlled to capture different color components at different times. FIG. 7E illustrates an example of a frame sequence 760 including a set of 2D image frames and 3D image frames generated by image sensor 700. In the example of FIG. 7D, frame sequence 760 may include three 3D image frames, followed by a 2D image frame, and then 3D image frames. Each of the 3D image frame and 2D image frame may be captured within, respectively, a 3D exposure period and a 2D exposure period, and the 2D exposure period may include separate exposure periods for different color components.

Figure 8A:
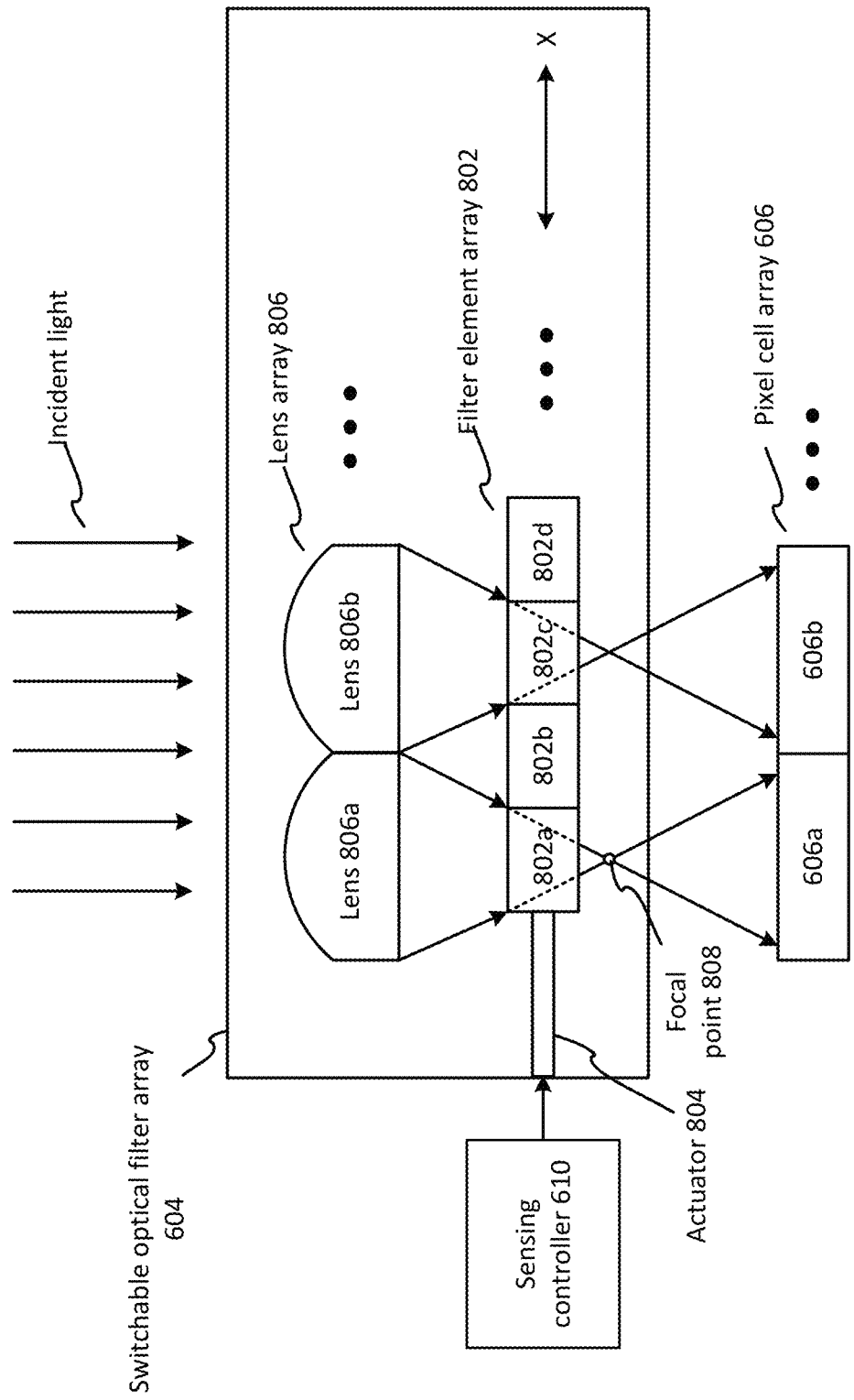
FIG. 8A, FIG. 8B, FIG. 8C, and FIG. 8D illustrate examples of a switchable optical filter of the image sensor of FIG. 6.

FIG. 8A, FIG. 8B, FIG. 8C, and FIG. 8D illustrate an example of switchable optical filter array 604 and its operations. As shown in FIG. 8A, switchable optical filter array 604 can be interposed between a source of incident light and pixel cell array 606 to control an optical frequency range of light received by pixel cell array 606. Switchable optical filter array 604 may include a filter element array 802 and an actuator 804 coupled with filter element array 802 to move the filter element array. Actuator 804 may include, for example, a set of motors that can pull filter element array 802 along different directions.

Filter element array 802 may include an array of filter elements arranged to form a plane including, for example, filter elements 802a, 802b, 802c, and 802d, etc. Each pixel cell may be assigned a set of filter elements and to receive light through one filter element from the assigned set. For example, referring to FIG. 8A and FIG. 8C, pixel cell 606a can be assigned a set of four filter elements including filter elements 802a and 802b, as well as filter elements 802e and 802f (shown in FIG. 8C). Moreover, pixel cell 606b can be assigned to another set of four filter elements including filter elements 802c and 802d (the remaining filter elements not shown in FIG. 8A). Each set of filter elements may have identical sets of different optical frequency ranges. For example, filter elements 802a, 802b, and 802e of a first set may pass light of optical frequency ranges corresponding to, respectively, a first color component, a second color component, and a third color component of visible light (e.g., red, green, and blue lights), whereas filter element 802f of the first set may pass light of an optical frequency range corresponding to invisible light (e.g., infra-red lights). Filter elements 802c and 802d of a second set may pass light of optical frequency ranges corresponding to the first color component and the second color component.

Figure 8B:
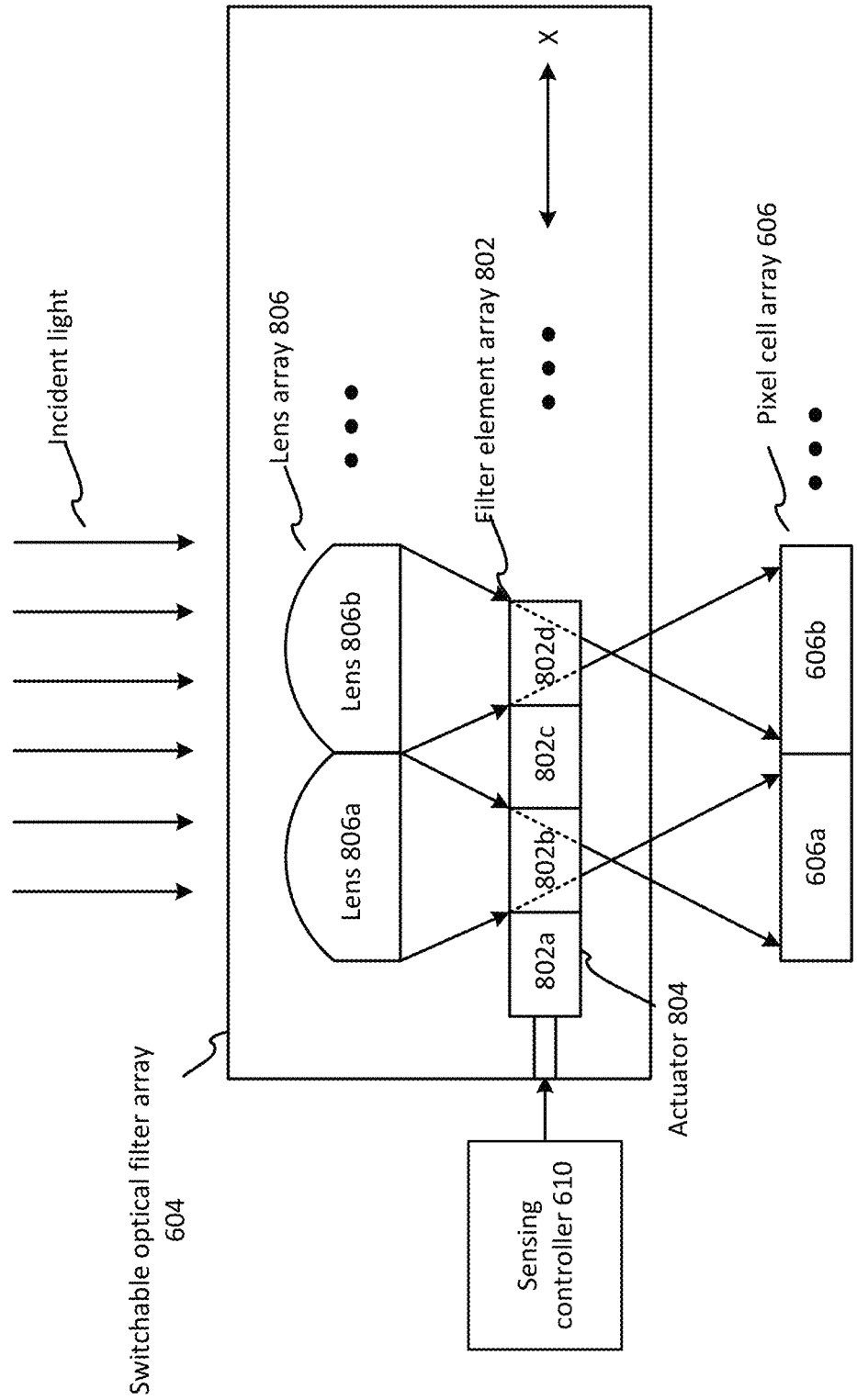
Figure 8C:
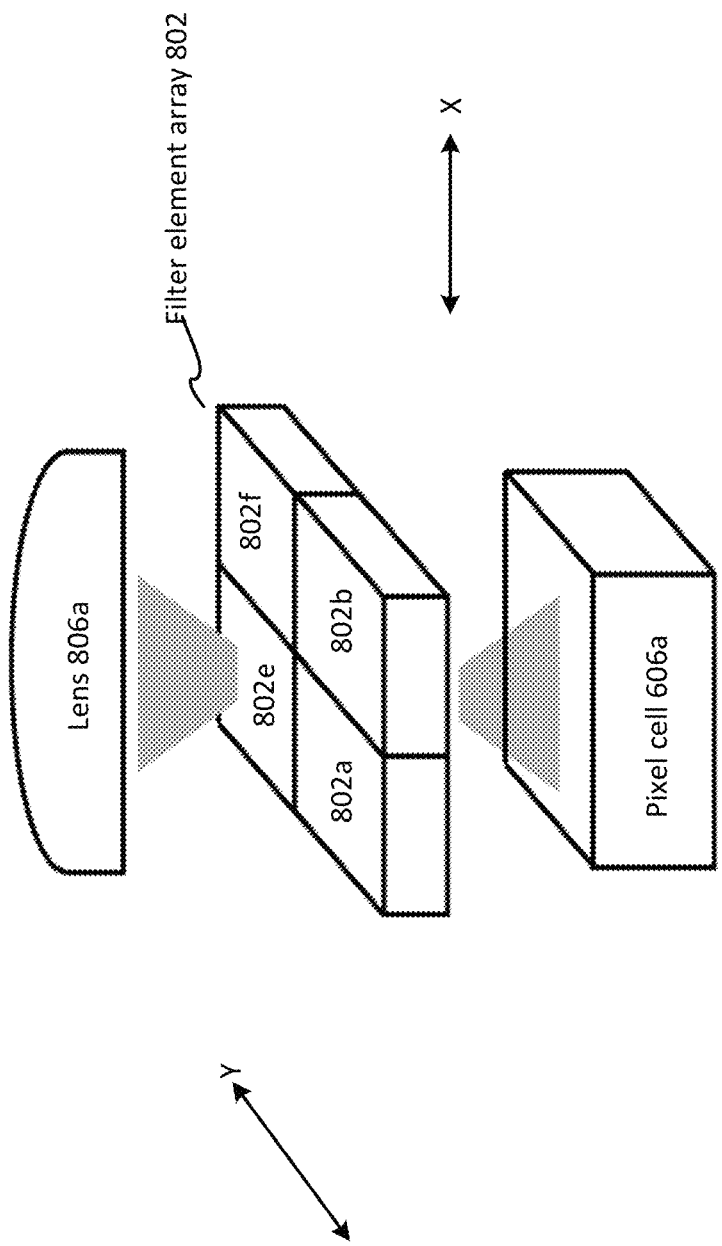

To control the optical frequency range of light received by each pixel cell, sensing controller 610 can control actuator 804 to move filter element array 802 along a first axis (e.g., an X-axis as shown in FIGS. 8A and 8B), and along a second axis (e.g., axis Y as shown in FIG. 8C). As filter element array 804 is moved to different positions, each pixel cell can receive light through one filter element that passes light of the same optical frequency range. For example, as shown in FIG. 8A, when filter element array 804 is moved to one position along the X-axis, pixel cells 606a and 606b may receive light of the first color component through, respectively, filter elements 802a and 802c. Also, as shown in FIG. 8B, when filter element array 804 is moved to another position along the X-axis, pixel cells 606a and 606b may receive light of the second color component through, respectively, filter elements 802b and 802d. Further, as shown in FIG. 8C, when filter element array 804 is moved to another position along the Y-axis, pixel cell 606a may receive light of the third color component through filter element 802e. Although not shown in FIG. 8C, it is understood that pixel cell 606b may also receive light of the third color component through another filter element of filter element array 804.

As shown in FIG. 8A-FIG. 8C, each filter element has a pitch (or width) that is half of the pitch (or width) of a pixel cell along both the X-axis and the Y-axis. Such arrangement allows each set of filter elements assigned to each pixel cell to be arranged side-by-side along the X-axis and the Y-axis. With such arrangements, the selection of a filter element for each pixel cell can be performed by moving the entire filter element array along the X-axis and/or the Y-axis. With each filter element having an effective area that is a quarter of a pixel cell, there may be a need to direct the incident light through the filter element onto the pixel cell, to increase the likelihood that that the pixel cell only receives light through the filter element, such that the output of the pixel cell corresponds to intensity of light of the selected optical frequency range.

As shown in FIG. 8A-FIG. 8C, switchable optical filter array 604 may include a lens array 806 on top of (or in front of) both of filter element array 802 and pixel cell array 606, to direct the incident light through one filter element of each set of filter element onto a pixel cell. For example, as shown in FIG. 8A, lens 806a of lens array 806 can focus incident light at a focal point 808 and through filter element 802a. Pixel cell 606a is positioned at a pre-determined distance from focal point 808 such that the pixel cell only receives light that goes through focal point 808. With such arrangement, pixel cell 606a may only receive light that has traveled through and has been filtered by filter element 802a. Similar arrangements can be provided using lens 806b for pixel 606b.

Figure 8D:
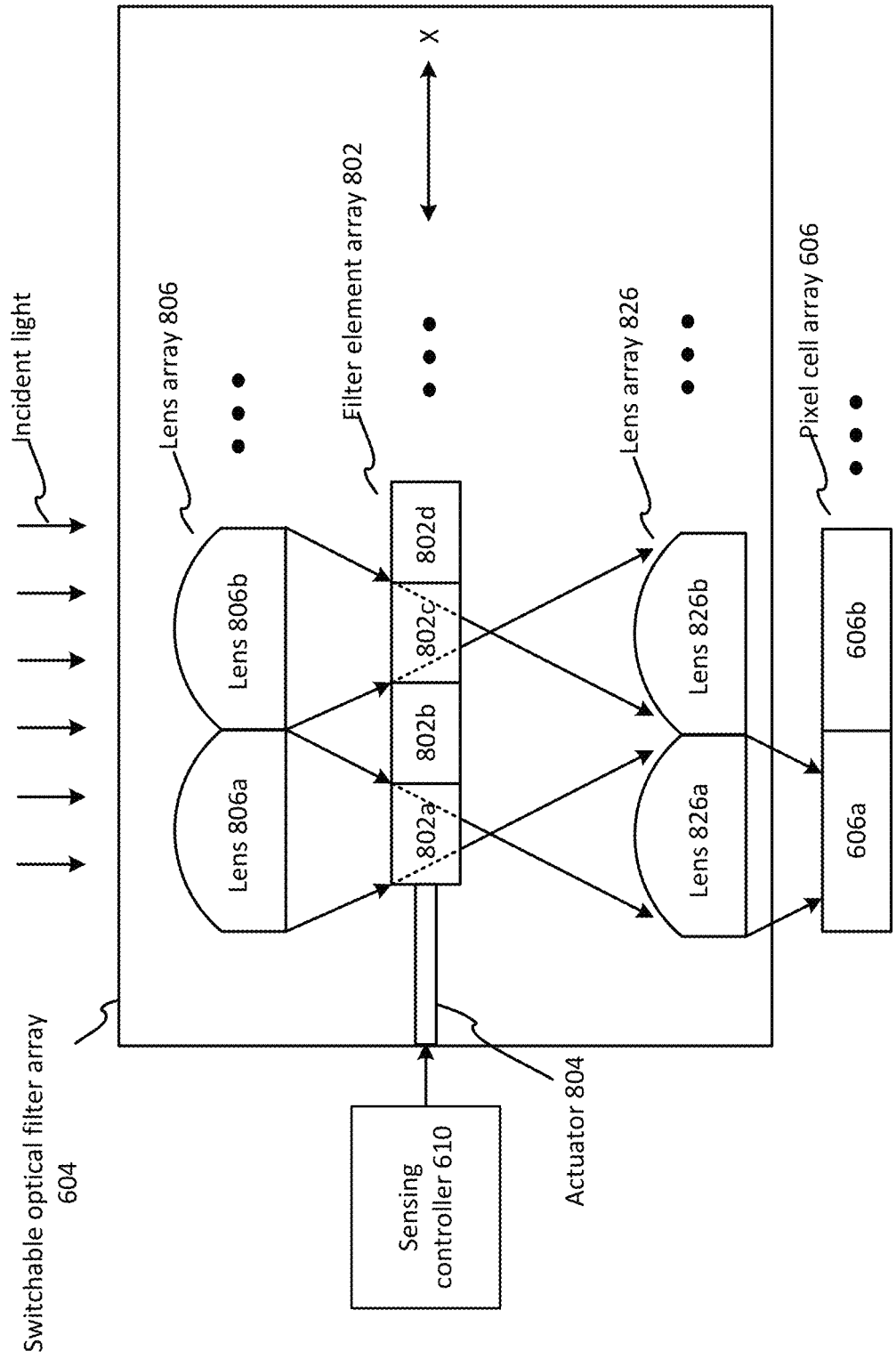

In some examples, as shown in FIG. 8D, switchable optical filter array 604 may include a lens array 826 between filter element array 802 and pixel cell array 606. In some examples, lens array 826 can be included in addition to lens array 806, to further focus the filtered light generated by filter element array 802 as the light propagates towards pixel cell array 606. The additional focusing can further increase the likelihood that the pixel cell only receives light through the filter element, and that the output of the pixel cell corresponds to intensity of light of the selected optical frequency range. Moreover, the additional focusing can also reduce cross talks between pixel cells. For example, the additional focusing can reduce the likelihood that filtered light that comes out of filter element 802c (and targeted at pixel cell 606b) from reaching pixel cell 606a. In some examples, lens array 806 can also be omitted, and the focusing of filtered light at the pixel cells can be performed using lens array 826.

Figure 9A:
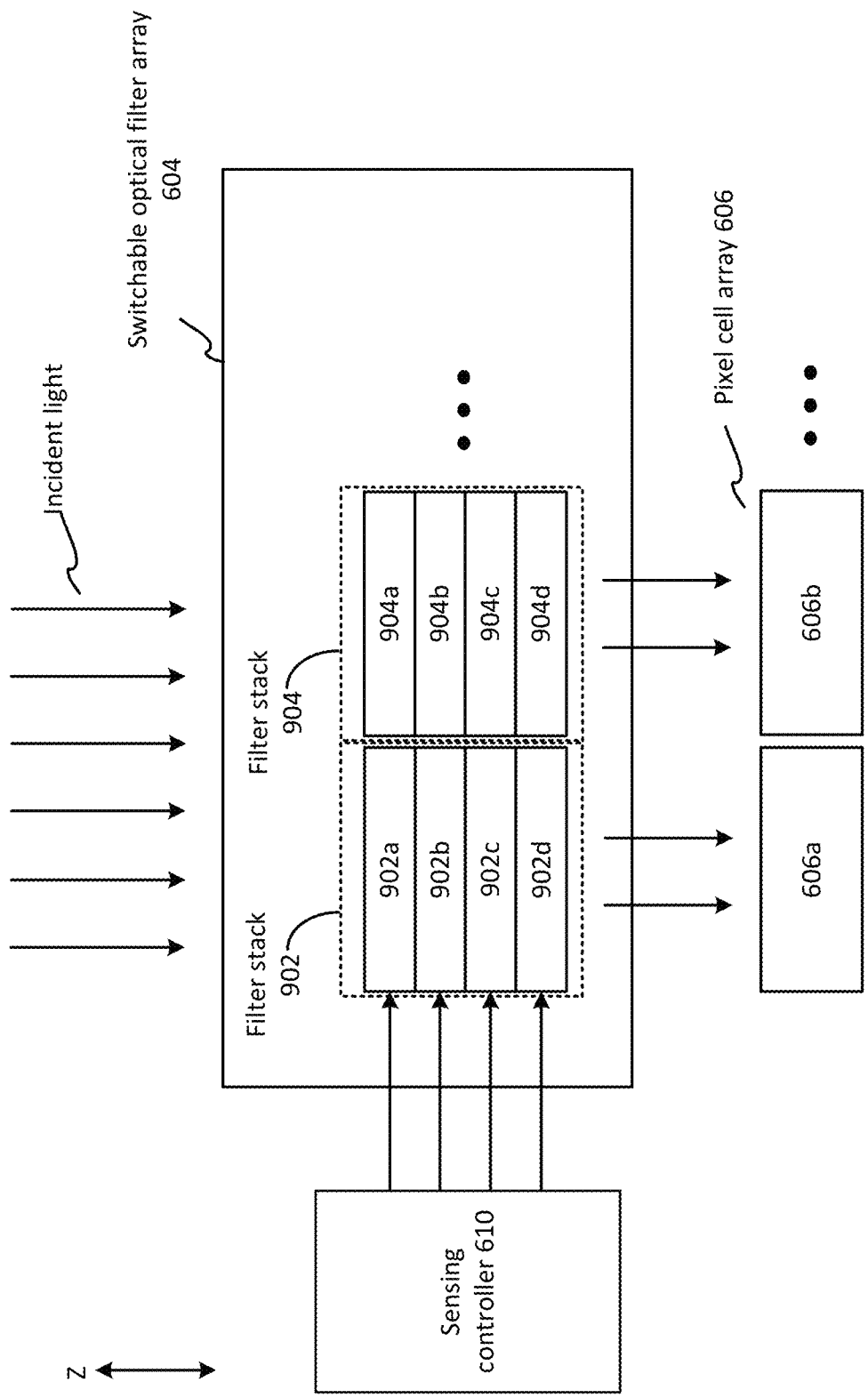
FIG. 9A, FIG. 9B, and FIG. 9C illustrate examples of a switchable optical filter of the image sensor of FIG. 6.
Figure 9B:
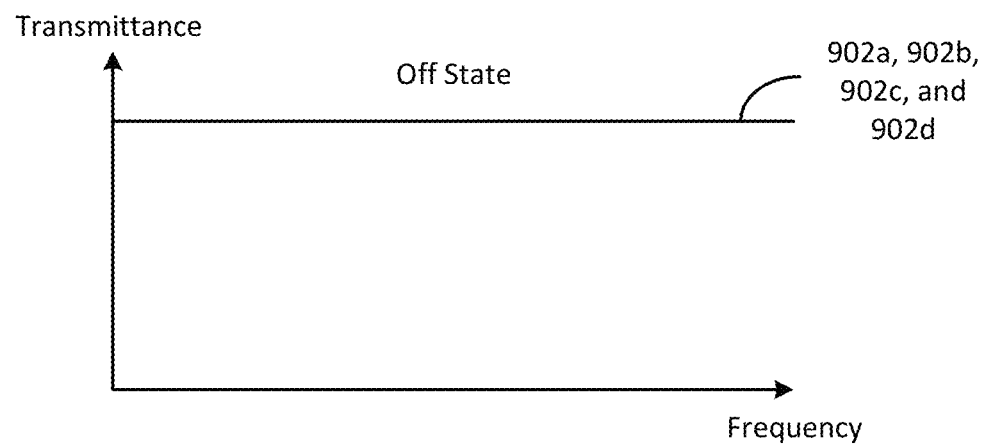
Figure 9B:
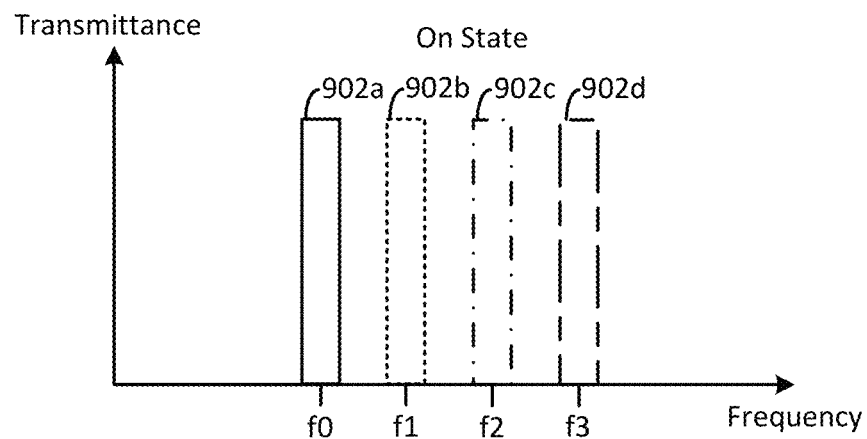

FIG. 9A and FIG. 9B illustrate other examples of switchable optical filter array 604 and its operations. As shown in FIG. 9A, switchable optical filter array 604 can be interposed between a source of incident light and pixel cell array 606 to control a optical frequency range of light received by pixel cell array 606. Switchable optical filter array 604 may include an array of filter stacks including filter stack 902 and filter stack 904. Each filter stack corresponding to a pixel cell is configured to control the optical frequency range of light received by the corresponding pixel cell. For example, filter stack 902 corresponds to pixel cell 606a, whereas filter stack 904 corresponds to pixel cell 606b. Each filter stack includes a plurality of filter elements stacked along a direction of propagation of incident light (e.g., along a Z-axis). For example, filter stack 902 includes filter elements 902a, 902b, 902c, and 902d forming a stack, whereas filter stack 904 includes filter elements 904a, 904b, 904c, and 904d forming another stack. Each filter stack can apply the same optical frequency range selection to each pixel cell, so that all pixel cells of pixel cell array 606 can be used to generate an image frame based on light of a selected optical frequency range. In some examples, one or more lens array similar to lens arrays 806 and 826 of FIG. 8A and FIG. 8D can be included to focus the filtered lights onto each pixel cell.

Each filter element can have a configurable light transmittance state that can be changed by applying an electrical signal and can be individually controlled by sensing controller 610. The combination of the light transmittance states of the filter elements within a stack can be used to select an optical frequency range of light to be received by a pixel cell. For example, referring to graph 910 of FIG. 9B, each filter element can provide maximum transmittance for light across a broad optical frequency range in an off state. Also, when in an on state, each filter element can provide maximum transmittance for light of a pre-determined optical frequency range (and minimum transmittance for light of other optical frequency ranges). For example, as shown in graph 912 of FIG. 9B, in an on state, filter element 902a (and filter element 904a) may have a maximum transmittance for light of optical frequency range f0 (e.g., for a red color component), filter element 902b (and filter element 904b) may have a maximum transmittance for light of optical frequency range f1 (e.g., for a green color component), filter element 902c (and filter element 904c) may have a maximum transmittance for light of optical frequency range f2 (e.g., for a blue color component), whereas filter element 902d (and filter element 904d) may have a maximum transmittance for light of optical frequency range f3 (e.g., for infra-red). To select a particular optical frequency range, one of the filter elements can be set in the on-state to provide maximum transmittance for light of the particular optical frequency range, whereas other filter elements can be set in the off-state. Sensing controller 610 can switch the states of each filter element at different times to enable all pixels of pixel array 606 to generate image frames based on light of different optical frequency ranges, as discussed above.

Figure 9C:
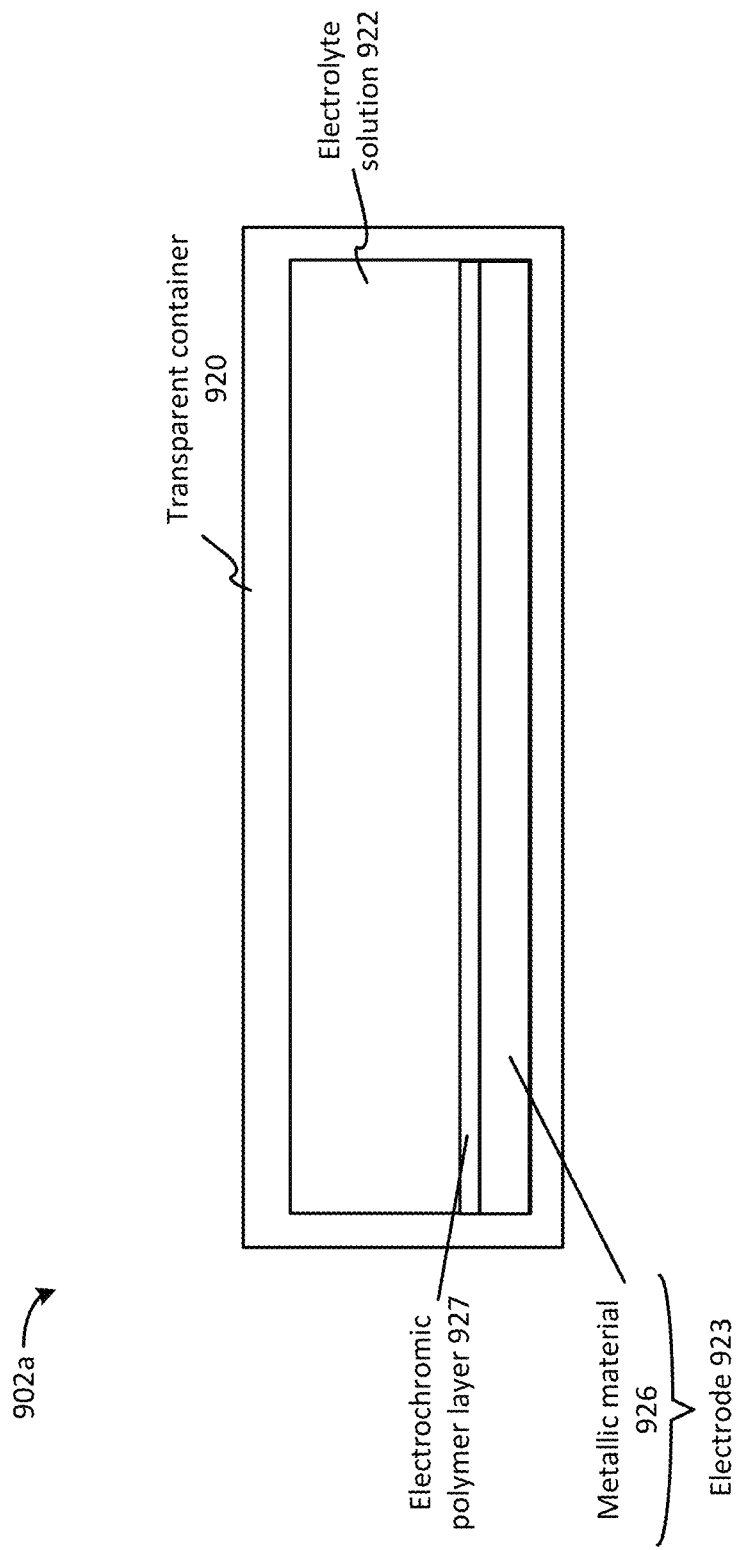

In the examples of FIG. 9A and FIG. 9B, each filter element may include a tunable electrochromic filter. FIG. 9C illustrates an example of filter element 902a that includes an electrochromic filter. As shown in FIG. 9C, filter element 902a may include a transparent container 920 that contains an electrolyte solution 922 and houses an electrode 923, which are submerged in electrolyte solution 922. Each electrode may include a metallic material 926 and coated with an electrochromic polymer layer 927. The electrochromic polymer layer 927 can include, for example, polyaniline.

The electrochromic filter in FIG. 9C can selectively transmit light of a particular optical frequency range when turned on, with the optical frequency range being set based on a film of the filter in either a reduced state (when turned off) or oxidized state (when turned on), which changes the transmissive properties of film for a particular optical frequency range. For example, when the electrodes are supplied with power, electrons from the electrode and ions from the electrolyte either flow into or out of the polymer which in turn changes the polymer's optical absorption characteristics. Moreover, different chemical elements can be used for metallic material 926 and for electrolyte solution 922 to change the color of the oxidized materials in the film. For example, electrolyte solution 922 may include tungsten oxide. When the electrodes are supplied with power, the oxidation state of tungsten oxide may change, which can change the color of electrochromic filter and the optical frequency range of light the filter can pass. Other materials can also be used for electrochromic polymer layer 927 including, for example, conjugated conducting polymers.

In some examples, electrochromic polymer layer 927 may also include a polymer that can selectively transmit visible light when turned on, with the polymer being in either an orderly state (when turned on) or a disorderly state (when turned off). When the polymer is in the orderly state, visible light can go through, whereas when the polymer is in a disorderly state, visible light can be scattered, while invisible light such as infra-red light can go through. By changing the state of electrochromic polymer layer 927, a pixel cell can be used to perform visible light intensity measurement and invisible light intensity measurement.

Figure 10:
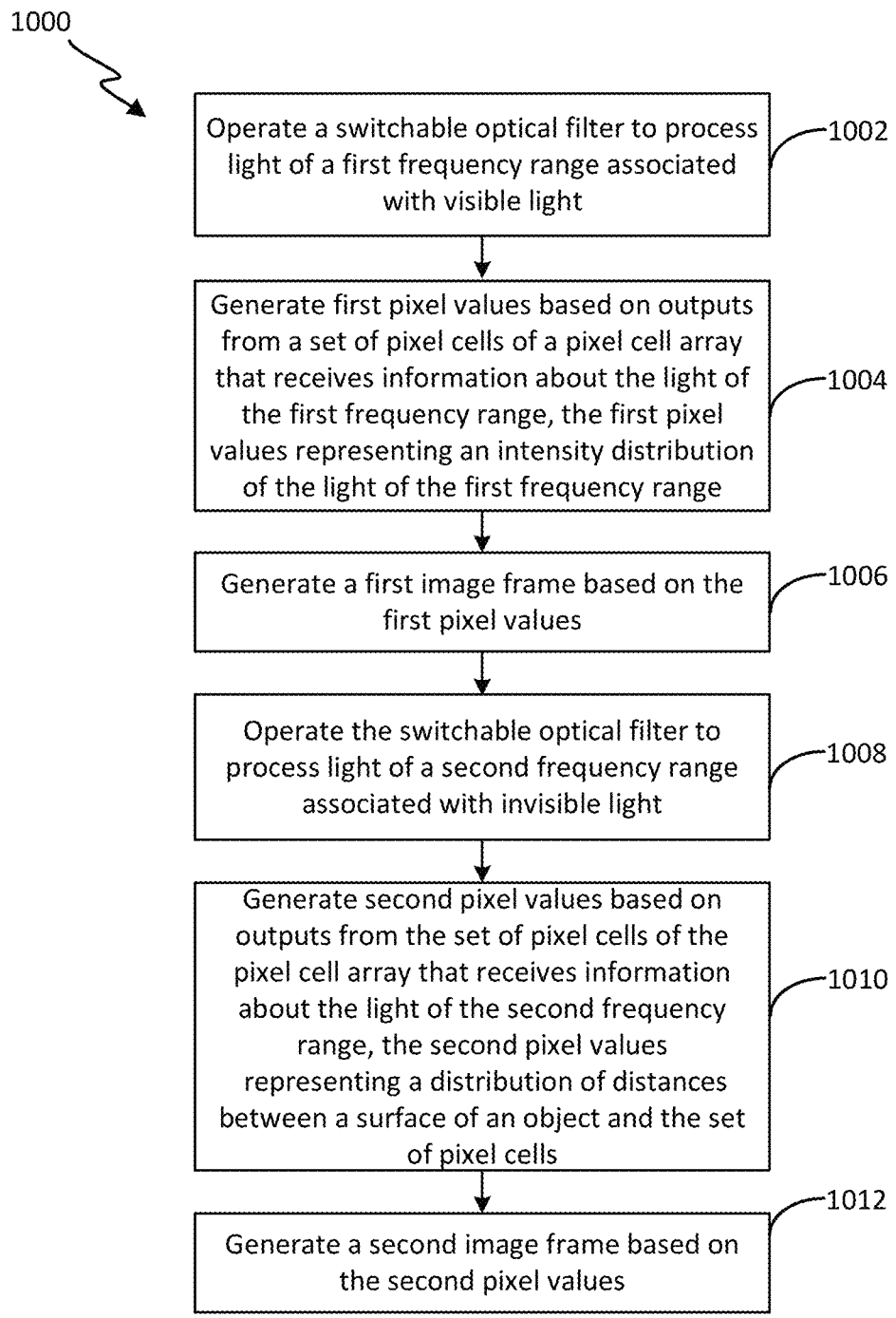
FIG. 10 illustrates an example of a flowchart for performing imaging.

FIG. 10 illustrates an embodiment of a flowchart of a process 1000 for performing imaging of a scene. Process 1000 can be performed by, for example, control circuitries 510 in conjunction with various components of image sensor 600 including sensing controller 610. Process 1000 begins in step 1002, where sensing controller 610 operates a switchable optical filter to process light of a first optical frequency range associated with visible light. Step 1002 may include, for example, moving the switchable optical filter to align a filter element with a pixel cell to pass one or more color components of visible light to the pixel cell. Step 1002 may also include, for example, applying one or more electrical signals to a switchable optical filter with electrochromic materials or other materials, to configure the switchable optical filter to provide maximum transmittance for one or more color components of visible light (and to reduce the transmittance for other visible light components) for the pixel cell.

In step 1004, light intensity measurement module 622 may obtain outputs from a set of pixel cells of a pixel cell array that receives information about the light of the first optical frequency range, and generate first pixel values representing an intensity distribution of the light of the first optical frequency range based on the outputs. For example, each of the set of pixel cells may include a photodiode to generate photocurrents based on receiving the light of the first optical frequency range from the switchable optical filter during a first exposure period. Each of the set of pixel cells may also include a capacitor to convert the photocurrents into a voltage representing the intensity of light of the first optical frequency range received within the first exposure period, and the voltage can be output. The voltage can be sampled and digitized by an ADC in light intensity measurement module 622 to generate the first pixel values. The first pixel values can then be used to generate a first image frame (e.g., a 2D image frame) in step 1006.

In step 1008, sensing controller 610 operates a switchable optical filter to process light of a second optical frequency range associated with invisible light, such as infra-red light. Step 1008 may include, for example, moving the switchable optical filter to align a filter element with a pixel cell to pass invisible light components to the pixel cell. Step 1008 may also include, for example, applying one or more electrical signals to a switchable optical filter with electrochromic materials other materials, to configure the switchable optical filter to provide maximum transmittance for invisible light components (and to reduce the transmittance for visible light components) for the pixel cell.

In step 1010, time-of-flight measurement module 624 may obtain outputs from the set of pixel cells which receives information about the light of the second optical frequency range, and generate second pixel values representing a distribution of distances between a surface of an object and the set of pixel cells based on the outputs. For example, time-of-flight measurement module 624 can keep track of a time when an infra-red pulse is projected to the object, and the times when the set of pixel cells receive reflected infra-red photons. Time-of-flight measurement module 624 may detect that the set of pixel cells receive reflected infra-red photons based on a change in capacitor voltages at the set of pixel cells. The time-of-flight information can be used to estimate a distance between the set of pixel cells and different spots of the object, and the second pixel values can be generated based on the distance estimates. The second pixel values can then be used to generate a first image frame (e.g., a 3D image frame) in step 1012.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus comprising:
   a first pixel cell;
   a second pixel cell;
   a switchable optical filter configured to:
      select one of a first optical frequency range or a second optical frequency range and pass light of the selected optical frequency range to reach the first pixel cell, and
      select one of a third optical frequency range or a fourth optical frequency range and pass light of the selected optical frequency range to the second pixel cell; and
   a controller configured to:
      at a first time:
         operate the switchable optical filter to pass light of the first optical frequency range and light of the third optical frequency range to, respectively, the first pixel cell and the second pixel cell,
         operate the first pixel cell to generate a first output based on the light of the first optical frequency range, and
         operate the second pixel cell to generate a second output based on the light of the third optical frequency range; and
      at a second time:
         operate the switchable optical filter to pass light of the second optical frequency range and light of the fourth optical frequency range to, respectively, the first pixel cell and the second pixel cell,
         operate the first pixel cell to generate a third output based on the light of the second optical frequency range, and
         operate the second pixel cell to generate a fourth output based on the light of the fourth optical frequency range.

2. The apparatus of claim 1, wherein the switchable optical filter is configured to:
   select one of the first optical frequency range, the second optical frequency range, or a fifth optical frequency range, and pass light of the selected optical frequency range to the first pixel cell, and
   select one of the third optical frequency range, the fourth optical frequency range, or a sixth optical frequency range, and pass light of the selected optical frequency range to the second pixel cell; and
   wherein the controller is configured to:
   at a third time:
      operate the switchable optical filter to pass light of the fifth optical frequency range and light of the sixth optical frequency range to, respectively, the first pixel cell and the second pixel cell;
      operate the first pixel cell to generate a fifth output based on the light of the fifth optical frequency range; and
      operate the second pixel cell to generate a sixth output based on the light of the sixth optical frequency range.

3. The apparatus of claim 2, wherein the controller is configured to operate the first pixel cell to compute a pixel value of an image frame based on an average of an intensity measurement of the light of the first optical frequency range, an intensity measurement of the light of the second optical frequency range, and an intensity measurement of the light of the fifth optical frequency range.

4. The apparatus of claim 1,
   wherein the first optical frequency range is part of a visible light frequency range; and
   wherein the second optical frequency range is part of an invisible light frequency range.

5. The apparatus of claim 1, wherein the controller is further configured to:
   generate image pixel values of an object based on the first output and the second output; and
   perform a distance measurement of the object based on the third output and the fourth output.

6. The apparatus of claim 1, further comprising an illuminator;
   wherein the controller is configured to:
      operate the illuminator to project the light of the second optical frequency range to the object at a third time preceding the second time;
      operate the switchable optical filter to pass the light of the second optical frequency range reflected by the object;
      operate the first pixel cell to generate an indication of a fourth time when the light of the second optical frequency range reflected by the object reaches the first pixel cell; and
      perform a distance measurement based on a difference between the third time and the fourth time.

7. The apparatus of claim 1, wherein the switchable optical filter includes a filter array including a first filter element and a second filter element.

8. The apparatus of claim 7, wherein the first filter element is adjacent to the second filter element;
   wherein the first filter element is configured to pass the light of the first optical frequency range;
   wherein the second filter element is configured to pass the light of the second optical frequency range; and
   wherein the switchable optical filter is configured to:
      at the first time, move the filter array to allow light to pass through the first filter element to the first pixel cell to enable the first pixel cell to receive the light of the first optical frequency range; and
      at the second time, move the filter array to allow light to pass through the second filter element to the first pixel cell to enable the first pixel cell to receive the light of the second optical frequency range.

9. The apparatus of claim 8,
wherein the first filter element is adjacent to the second filter element along a first axis;
wherein a dimension of each of the first filter element and the second filter element along the first axis is half of a dimension of the first pixel cell along the first axis;
and wherein the switchable optical filter is configured to move the filter array along the first axis.

10. The apparatus of claim 9, further comprising one or more convergent lens to focus light onto one of the first filter element or the second filter element.

11. The apparatus of claim 9,
wherein the switchable optical filter further includes a third filter element adjacent to the first filter element along a second axis;
wherein a dimension of each of the first filter element and the third filter element along the second axis is half of a dimension of the first pixel cell along the second axis;
and wherein the switchable optical filter is configured to move the filter array along the second axis.

12. The apparatus of claim 11, wherein the switchable optical filter further comprises a first actuator configured to move the filter array along the first axis and a second actuator configured to move the filter array along the second axis.

13. The apparatus of claim 7, wherein the first filter element and the second filter element form a stack structure over the first pixel cell;
wherein, at the first time:
the first filter element is configured to pass light of the first optical frequency range, and
the second filter element is configured to pass light of a fifth optical frequency range including the first optical frequency range; and
wherein, at the second time:
the second filter element is configured to pass light of the second optical frequency range, and
the first filter element is configured to pass light of a sixth optical frequency range including the second optical frequency range.

14. The apparatus of claim 13, wherein the first filter element includes a first electrochromic material; and wherein the second filter element includes a second electrochromic material.

15. The apparatus of claim 1, wherein the first optical frequency range and the third optical frequency range are associated with different colors of visible light; and
wherein the second optical frequency range and the fourth optical frequency range include an optical frequency range associated with infra-red light.

16. An apparatus comprising:
a pixel cell array comprising a first set of pixel cells and a second set of pixel cells;
a switchable optical filter array comprising a first set of filter elements, a second set of filter elements, a third set of filter elements, and a fourth set of filter elements, the first set of filter elements configured to pass light of a first optical frequency range, the second set of filter elements configured to pass light of a second optical frequency range, the third set of filter elements configured to pass light of a third optical frequency range, the fourth set of filter elements configured to pass light of a fourth optical frequency range;
a controller configured to operate the switchable optical filter array to:
at a first time:
enable the first set of pixel cells to receive the light of the first optical frequency range passed by the first set of filter elements, and to generate a first set of pixel values based on the received light of the first optical frequency range; and
enable the second set of pixel cells to receive the light of the third optical frequency range passed by the third set of filter elements, and to generate a second set of pixel values based on the received light of the third optical frequency range;
and at a second time:
enable the first set of pixel cells to receive the light of the second optical frequency range passed by the second set of filter elements, and to generate a third set of pixel values based on the received light of the second optical frequency range; and
enable the second set of pixel cells to receive the light of the fourth optical frequency range passed by the fourth set of filter elements, and to generate a fourth set of pixel values based on the received light of the fourth optical frequency range.

17. The apparatus of claim 16, wherein the controller is configured to:
at the first time, move the switchable optical filter array to align the first set of filter elements with the first set of pixel cells; and
at the second time, move the switchable optical filter array to align the second set of filter elements with the first set of pixel cells.

18. The apparatus of claim 16, wherein the first set of filter elements and the second set of filter elements form a stack over the first set of pixel cells; and
wherein the controller is configured to:
at the first time, apply one or more first signals to the switchable optical filter array to change a transmittance of the first set of filter elements for the light of the first optical frequency range; and
at the second time, apply one or more second signals to the switchable optical filter array to change a transmittance of the second set of filter elements for the light of the second optical frequency range.

19. A method comprising:
at a first time, operating a switchable optical filter to pass light of a first optical frequency range and light of a second optical frequency range to, respectively, a first set of pixel cells and a second set of pixel cells of a pixel cell array;
generating first pixel values based on outputs from the first set of pixel cells, the first pixel values representing measurements of the light of the first optical frequency range;
generating second pixel values based on outputs from the second set of pixel cells, the second pixel values representing measurements of the light of the second optical frequency range;
at a second time, operating the switchable optical filter to pass light of a third optical frequency range and light of a fourth optical frequency range to, respectively, the first set of pixel cells and the second set of pixel cells;
generating third pixel values based on outputs from the first set of pixel cells, the third pixel values representing measurements of the light of the third optical frequency range; and
generating fourth pixel values based on outputs from the second set of pixel cells, the fourth pixel values representing measurements of the light of the fourth optical frequency range.

20. The method of claim 19, wherein the switchable optical filter is moved with respect to the pixel cell array between the first time and the second time.

21. The method of claim 19, wherein the switchable optical filter comprises a first set of filter elements and a second set of filter elements forming a stack over the first set of pixel cells;

wherein the switchable optical filter is operated to pass the light of the first optical frequency range to the first set of pixel cells at the first time based on applying one or more first signals to the switchable optical filter to change a transmittance of the first set of filter elements for the light of the first optical frequency range; and wherein the switchable optical filter is operated to pass the light of the third optical frequency range to the first set of pixel cells at the second time based on applying one or more second signals to the switchable optical filter to change a transmittance of the first set of filter elements for the light of the third optical frequency range.

* * * * *